(12) United States Patent
Fujinaga

(10) Patent No.: US 9,235,369 B2
(45) Date of Patent: Jan. 12, 2016

(54) MOBILE INFORMATION PROCESSING TERMINAL AND METHOD THEREFOR, AND NON-TRANSITORY COMPUTER-READABLE STORAGE MEDIUM FOR CHARGING PAYMENT OF UNPRINTED PORTION OF A PRINT JOB

(71) Applicant: CANON KABUSHIKI KAISHA, Tokyo (JP)

(72) Inventor: Seiya Fujinaga, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/339,842

(22) Filed: Jul. 24, 2014

(65) Prior Publication Data

US 2015/0036181 A1   Feb. 5, 2015

(30) Foreign Application Priority Data

Jul. 31, 2013  (JP) .................................. 2013-159717

(51) Int. Cl.
  *G06F 3/12*    (2006.01)
  *G06Q 20/14*   (2012.01)
  *G06Q 20/32*   (2012.01)

(52) U.S. Cl.
  CPC ............ *G06F 3/1292* (2013.01); *G06F 3/1229* (2013.01); *G06Q 20/145* (2013.01); *G06Q 20/3278* (2013.01)

(58) Field of Classification Search
  CPC ... G06F 3/1229; G06F 3/1292; G06Q 20/145; G06Q 20/3278
  USPC .............................................. 358/1.14–1.15
  See application file for complete search history.

(56) References Cited

U.S. PATENT DOCUMENTS

| 7,451,117 B2 * | 11/2008 | Cozianu et al. ................. 705/52 |
| 2002/0010678 A1 * | 1/2002 | Utsunomiya .................... 705/40 |
| 2002/0106994 A1 * | 8/2002 | Payne et al. .................. 455/74.1 |
| 2005/0060341 A1 * | 3/2005 | Shiina .......................... 707/102 |

(Continued)

FOREIGN PATENT DOCUMENTS

| JP | 10-207310 A | 8/1998 |
| JP | 2000-259386 A | 9/2000 |

OTHER PUBLICATIONS

U.S. Appl. No. 14/309,295, filed Jun. 19, 2014. Applicant: Seiya Fujinaga.

*Primary Examiner* — Benny Q Tieu
*Assistant Examiner* — Quyen V Ngo
(74) *Attorney, Agent, or Firm* — Fitzpatrick, Cella, Harper & Scinto

(57) ABSTRACT

The invention provides a system in which, in a case where an event requiring a user operation occurs on a mobile terminal side, a printer can continue the print processing even if the terminal is moved outside the range of short distance communication by paying in advance a print fee to the printer. When the printer receives a print job from the terminal using short distance wireless communication, it charges the terminal every time one paper sheet is printed. If the terminal receives an incoming call, it transmits an advance payment request for an unprinted portion to the printer so that printing is continued even if the terminal is moved outside the range of short distance wireless communication. Upon receiving the request, the printer performs charging according to an amount indicated by the request, and continues printing of the unprinted portion.

8 Claims, 16 Drawing Sheets

(56) References Cited

U.S. PATENT DOCUMENTS

| | | | |
|---|---|---|---|
| 2005/0270564 A1* | 12/2005 | Yun | 358/1.15 |
| 2005/0270571 A1* | 12/2005 | Fujitani et al. | 358/1.15 |
| 2007/0035762 A1* | 2/2007 | Wilsher et al. | 358/1.14 |
| 2008/0030750 A1* | 2/2008 | Kato | 358/1.4 |
| 2008/0137138 A1* | 6/2008 | Matoba | 358/1.15 |
| 2009/0103124 A1* | 4/2009 | Kimura et al. | 358/1.15 |
| 2012/0147420 A1* | 6/2012 | Nishimi et al. | 358/1.15 |
| 2013/0073456 A1* | 3/2013 | Matsuda et al. | 705/40 |
| 2013/0250330 A1* | 9/2013 | Chigusa | 358/1.13 |

* cited by examiner

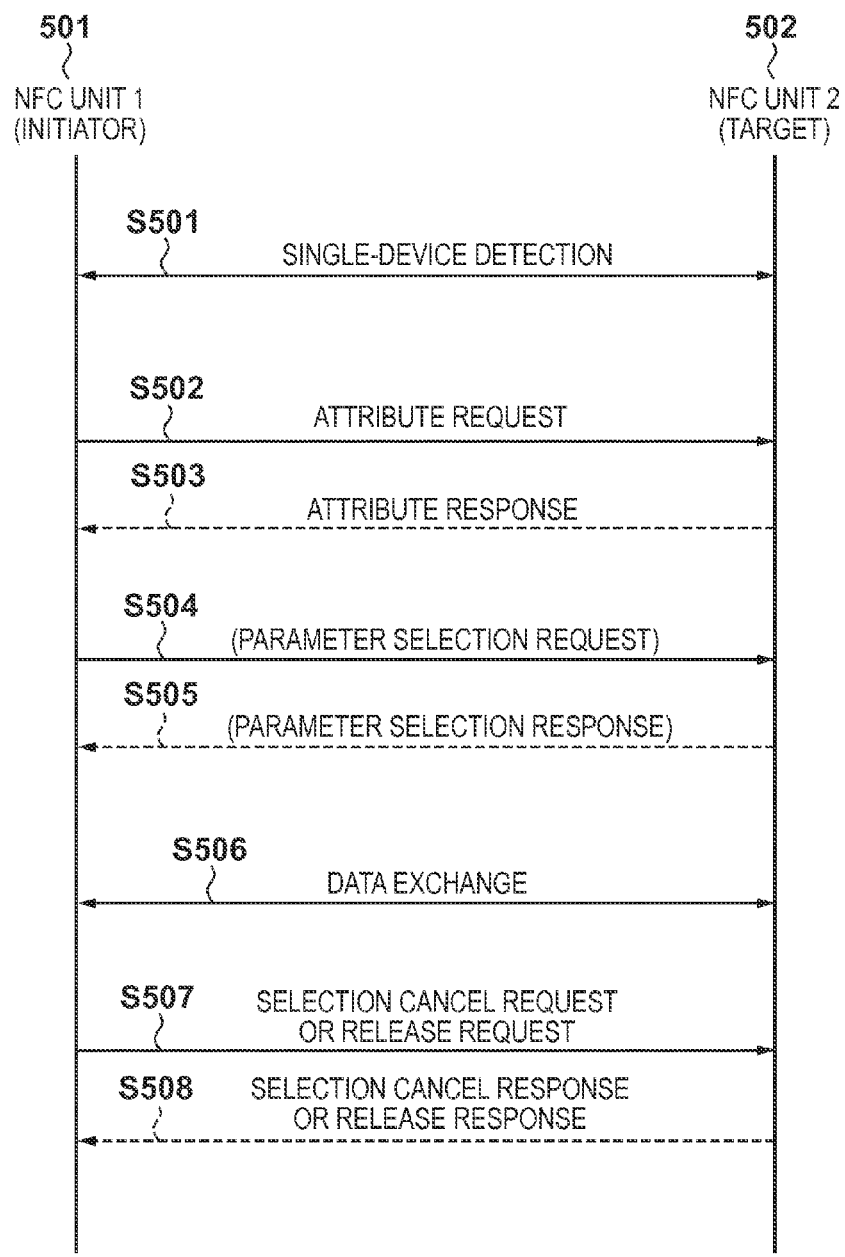

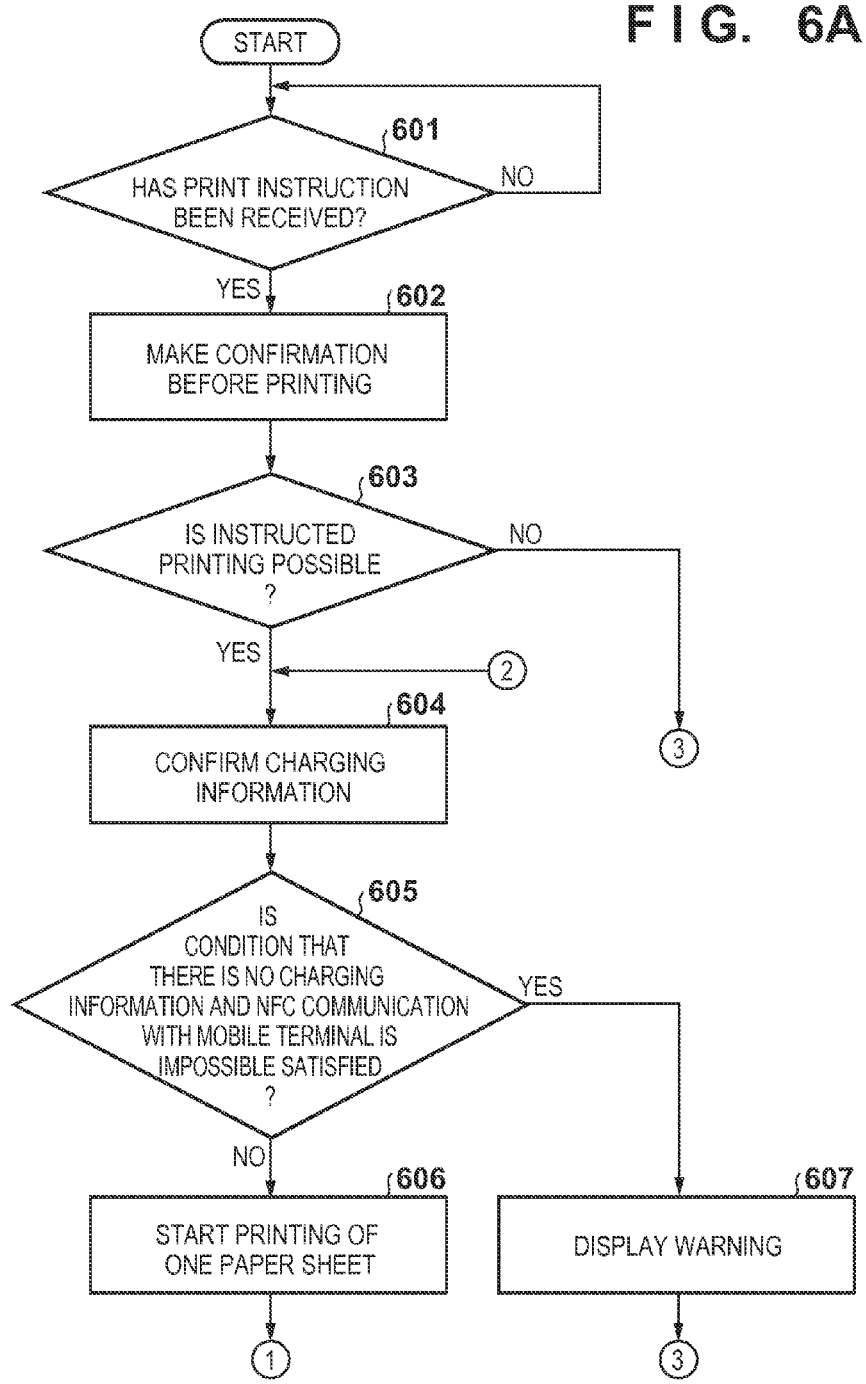

MOBILE INFORMATION PROCESSING TERMINAL AND METHOD THEREFOR, AND NON-TRANSITORY COMPUTER-READABLE STORAGE MEDIUM FOR CHARGING PAYMENT OF UNPRINTED PORTION OF A PRINT JOB

BACKGROUND OF THE INVENTION

1. Field of the Invention

The present invention relates to a printing apparatus and an information processing terminal, which are capable of performing short distance wireless communication.

2. Description of the Related Art

A method of charging for printed materials when executing printing using a printing apparatus has been adopted from long ago. Especially a service of executing printing by installing a copying machine and the like in a store has become widespread. Therefore, various charging methods are used.

For example, Japanese Patent Laid-Open No. 10-207310 (to be referred to as patent literature 1 hereinafter) describes a method in which when only one side of the last paper sheet is printed in double-sided printing, a system using a printing apparatus does not charge for the back surface of the last paper sheet. This method does not charge for output of a white paper sheet at the time of charging when outputting printed materials, as described above. A method of charging for each output printed material is one of general methods.

As described in Japanese Patent Laid-Open No. 2000-259386 (to be referred to as patent literature 2 hereinafter), there has been proposed a method of charging for an output material after printing by holding output job information and charging information in print data. Patent literature 2 also describes a method of charging for each printed material. Therefore, a charging system of a printing apparatus is built by a method of performing charging at the end of printing.

On the other hand, along with development of the communication technology, short distance wireless communication is becoming the mainstream as a communication method. There are various use cases including a use case in which, for example, authentication is performed by actually using short distance wireless communication. As a major use case, performing charging processing using electronic money or the like has begun to be widely used.

For the above-described typical method of performing charging when outputting a printed material, a case in which a charging system using short distance communication performs charging will be considered. In this case, since charging is performed every time printing is executed, a terminal to be charged needs to be able to exchange information with a printing apparatus all the time. Especially if the printing apparatus charges a mobile terminal such as a smartphone using a charging method using electronic money or the like by short distance communication every time printing is executed, the distance between the mobile terminal and the printing apparatus needs to fall within the range of the communicable distance of short distance communication. Consequently, while printing is actually executed, the use of the mobile terminal is limited.

SUMMARY OF THE INVENTION

The present invention is made in view of such problem. According to an aspect of this disclosure, there is provided a printing apparatus which includes a communication unit configured to perform short distance communication, and executes print processing according to a print job received via the communication unit, comprising: a charging unit configured to, in a case where a print job is received from an information processing terminal via the communication unit and an advance payment request for an unprinted portion is received from the information processing terminal via the communication unit during print processing based on the received print job, perform charging processing based on the advance payment request; and a print processing unit configured to execute print processing of the unprinted portion of the print job within a chargeable range in the charging processing by the charging unit.

According to the present invention, if a printing apparatus performs print processing based on a print job from an information processing terminal, and performs charging by short distance communication, in a case where an event requiring a user operation occurs on the information processing terminal side, even if the information processing terminal is moved outside the communicable range of short distance communication for charging, the printing apparatus can continue the print processing by making advance payment for the printing apparatus.

Further features of the present invention will become apparent from the following description of exemplary embodiments (with reference to the attached drawings).

BRIEF DESCRIPTION OF THE DRAWINGS

FIG. 5 is a sequence chart showing NFC communication in a passive mode;

FIGS. 6A and 6B are flowcharts illustrating a sequence executed by the printing apparatus for performing printing and charging processing;

DESCRIPTION OF THE EMBODIMENTS

An embodiment of the present invention will be described below with reference to the accompanying drawings. Note that the relative arrangement of the respective components of an apparatus, the shape of the apparatus, and the like, which are used in this embodiment, are merely examples. The present invention is not limited to them as long as it is implemented by an arrangement having the same effects.

In this embodiment, a method of performing charging processing at the time of printing in a printing system including an MFP (Multi-Function Peripheral) having a printing function capable of performing charging at the time of printing, and a mobile information processing terminal capable of performing charging processing will be described. In this embodiment, a high-performance compact information processing apparatus such as a smartphone is assumed as the mobile information processing terminal. The MFP and the mobile information processing terminal can communicate with each other by short distance communication whose communication distance is about ten-odd cm, and have an arrangement which allows charging processing using short distance communication. As short distance communication, NFC (Near Field Communication) communication is used.

Note that the present invention is implemented by the above-described arrangement in this embodiment. The present invention, however, is not limited to this as long as it is implemented using a unit with which it is possible to obtain the same effects.

Figure 1:
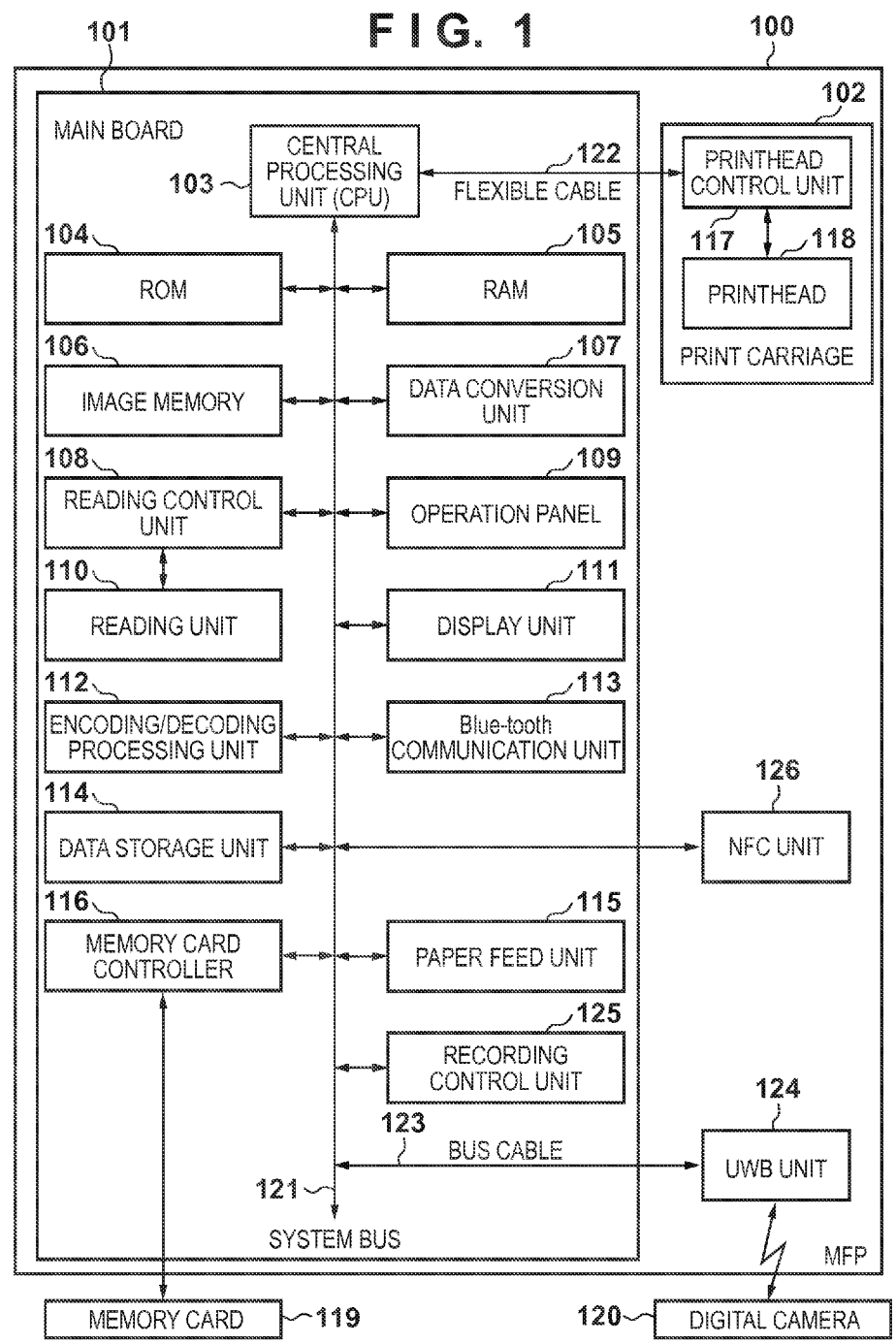
FIG. 1 is a block diagram showing a printing apparatus (MFP)

FIG. 1 is a block diagram showing the schematic arrangement of a printing apparatus (to be simply referred to as an MFP hereinafter) 100. The MFP 100 includes a main board 101 for executing main control of the apparatus, a print carriage 102 for receiving print data and controlling discharge of ink, and a UWB unit 124 for performing data communication with another device such as a digital camera 120.

In the main board 101, a CPU (processor) 103 is a system control unit, and controls the overall MFP 100. A ROM 104 stores control programs to be executed by the CPU 103, an embedded operating system (OS) program, and the like. In this embodiment, the CPU 103 executes the respective control programs stored in the ROM 104, thereby executing software control such as scheduling and task switching of the MFP 100 under the management of the embedded OS stored in the ROM 104.

A RAM 105 is implemented by an SRAM (Static RAM) or the like, and stores program control variables, setting values registered by the user, management data of the MFP 100, and the like. The RAM 105 is also allocated with various work buffer areas.

An image memory 106 is implemented by a DRAM (Dynamic RAM) or the like, and stores image data received via the UWB unit 124, those processed by an encoding/decoding processing unit 112, and those acquired from a memory card 119 via a memory card controller 116.

A data conversion unit 107 executes analysis of a page description language (PDL) and the like, conversion from image data into print data, and the like.

A reading control unit 108 will be explained. A reading unit 110 optically reads an original by a CIS image sensor (contact type image sensor). An image processing control unit (not shown) of the reading unit 110 performs various image processes such as binarization processing and halftone processing for an image signal converted into electrical image data, thereby outputting high resolution image data to the reading control unit 108. Note that in this embodiment, the reading control unit 108 is compatible with both a sheet reading control method of reading an original while conveying it and a book reading control method of scanning an original placed on an original table. In this embodiment, the reading unit can acquire tag information of an original. In this embodiment, there exists an NFC communicable tag on an original, and a reading apparatus which can also read information of the NFC communication tag is prepared in the reading unit. This arrangement enables the reading unit to read image information on an original and information of an NFC tag on the original.

An operation panel 109 is arranged on an interface panel 202 (see FIG. 2), and used by the user to decide image print data, set registration values, and perform a data setting registration operation. A display unit 111 is formed by an LED (Light Emitting Diode), an LCD (Liquid Crystal Display), and the like. Using the above components makes it possible to perform various input operations, and display operation states, status conditions, and the like of the MFP 100.

The encoding/decoding processing unit 112 executes encoding/decoding processing and enlargement/reduction processing for image data (MH, MR, MMR, JBIG, JPEG, or the like) handled by the MFP 100.

A Bluetooth® communication unit 113 controls communication by Bluetooth, and includes a communication I/F control unit, a baseband unit, an RF unit, and an antenna. This allows the MFP 100 to perform communication complying with the Bluetooth communication standard.

A data storage unit 114 is a portion for storing data. In this embodiment, since no data backup area is prepared in the DRAM of the image memory 106, the data storage unit 114 is prepared as a data saving area. Note that the memory structure is not limited to this. For example, the data storage unit 114 may share a memory with the image memory 106, or data may be backed up in the data storage unit 114. Furthermore, a digital image or the like can be saved in the data storage unit 114, and used for printing. A DRAM is used in this embodiment. However, the present invention is not limited to this, and a hard disk, a non-volatile memory, or the like may be used.

A paper feed unit 115 is a portion capable of holding paper sheets for printing. The paper feed unit 115 can feed a paper sheet under the control of a recording control unit 125. Especially, as the paper feed unit, a plurality of paper feed units can be prepared so as to hold a plurality of types of paper sheets in one apparatus. Then, the recording control unit 125 can control to select a paper feed unit to be used to feed paper sheets. Furthermore, a paper width detection unit capable of detecting the width of a paper sheet to be fed is provided to allow printing using paper width information at the time of printing.

When the memory card 119 is inserted, the memory card controller 116 transmits/receives data in the memory card via a protocol complying with the USB communication standard. The USB communication standard is a standard which allows high speed bidirectional data communication, and also allows connection of a plurality of hubs or functions (slaves) to one host (master).

The memory card 119 serves as a data storage medium, and can connect to the MFP 100. The memory card can save image data and other electronic data.

The print carriage 102 includes a printhead control unit 117 and a printhead 118. The print carriage 102 performs a print operation while moving in the main scanning direction. The printhead control unit 117 receives print data from the recording control unit 125 via a flexible cable 122. The printhead control unit 117 then controls ink to be discharged from the printhead 118 in accordance with the received data.

The UWB unit 124 serves as a communication unit for performing data communication with another device such as the digital camera 120. The UWB unit 124 converts data into packets, and transmits the packets to another device. Conversely, the UWB unit 124 converts packets coming from another external device into data, and transmits the data to the CPU 103. The UWB unit 124 is connected to a system bus 121 via a bus cable 123.

The recording control unit 125 performs, via the image processing control unit (not shown), various image processes such as smoothing processing, recording density correction processing, and color correction for image data to be printed, converts the resultant data into high resolution image data, and outputs the obtained image data to the printhead control unit 117. The recording control unit 125 also serves to periodically acquire the status information of the printhead control unit 117 by controlling it.

An NFC unit 126 is a unit capable of performing short distance communication. In this embodiment, the NFC unit 126 is connected via a bus. The CPU 103 can save contents communicated by the NFC unit in the RAM 105 or data storage unit 114, read out the stored information, and provide the information when communicating with another apparatus by short distance communication using the NFC unit 126. Furthermore, in this embodiment, a system for performing charging using electronic money is used. However, communication used for charging is performed using the NFC unit. Note that details of the NFC unit 126 will be described with reference to FIG. 4.

The above respective components 103 to 109 and 111 to 116 are connected to each other via the system bus 121 managed by the CPU 103. In this embodiment, it is possible to read an original using the reading unit 110 and the reading control unit 108, and save image data in the data storage unit 114 via the data conversion unit 107. After that, an image data print instruction can be issued by an operation through the operation panel 109. Upon receiving the print instruction, it is possible to convert data using the recording control unit 125, and print the data by the print carriage 102.

Figure 2:
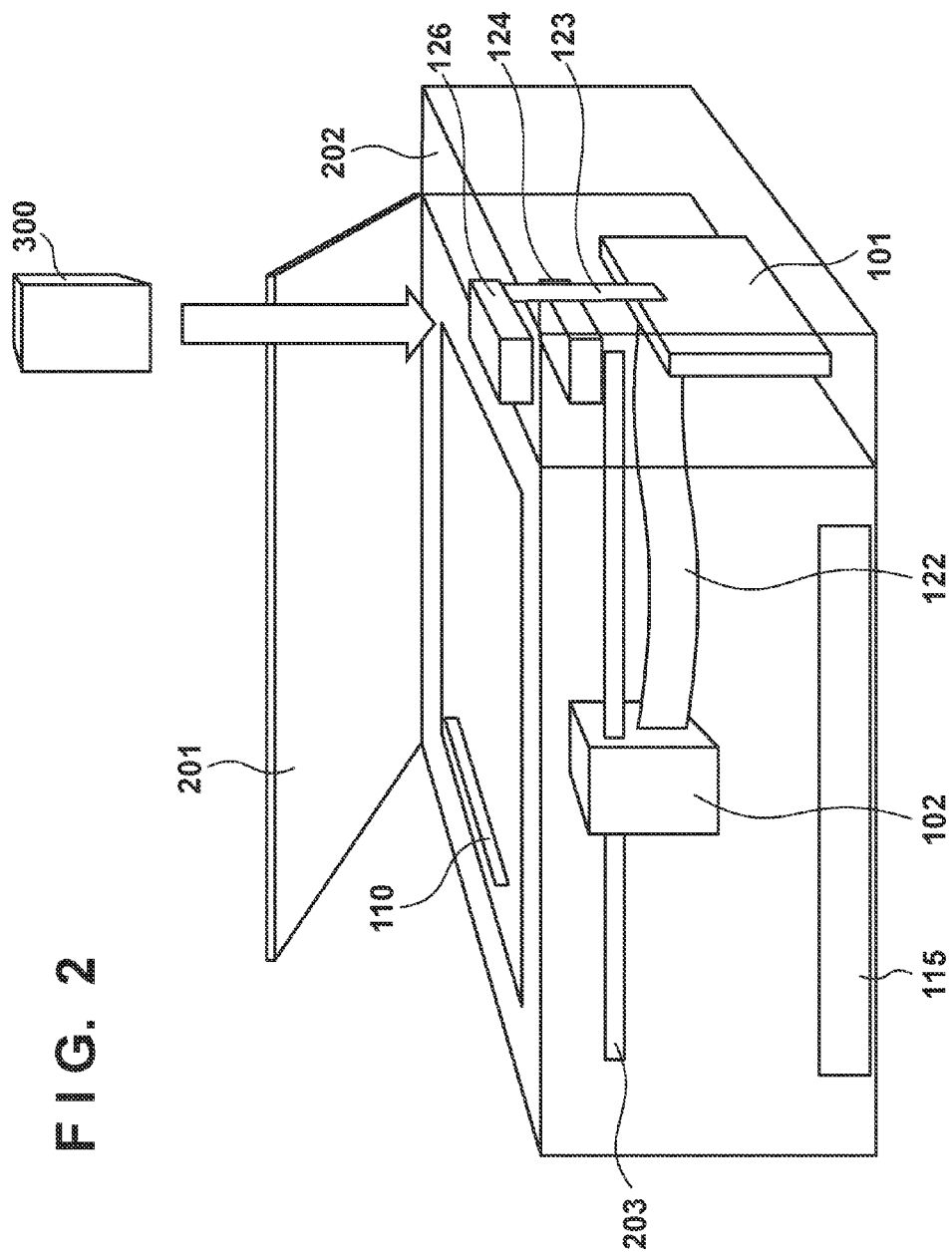
FIG. 2 is a perspective view showing the outer appearance of the printing apparatus, and transparently showing the internal arrangement of the printing apparatus.

FIG. 2 is a perspective view showing the outer appearance and internal arrangement of the MFP 100. The MFP 100 includes an original cover plate 201 to press an original. The main board 101 is attached to the right side of the housing of the MFP. The flexible cable 122 connecting the main board 101 and the print carriage 102 transmits print data. The flexible cable 122 can transmit/receive data even while the print carriage 102 reciprocates along a shaft 203. The NFC unit 126 is arranged outside the apparatus, as shown in FIG. 2, and connected to the main board 101 via the bus cable 123. In order to execute charging processing and print start processing by short distance communication, the user can move a mobile information processing terminal 300 closer to the NFC unit 126 to perform communication.

Figure 3:
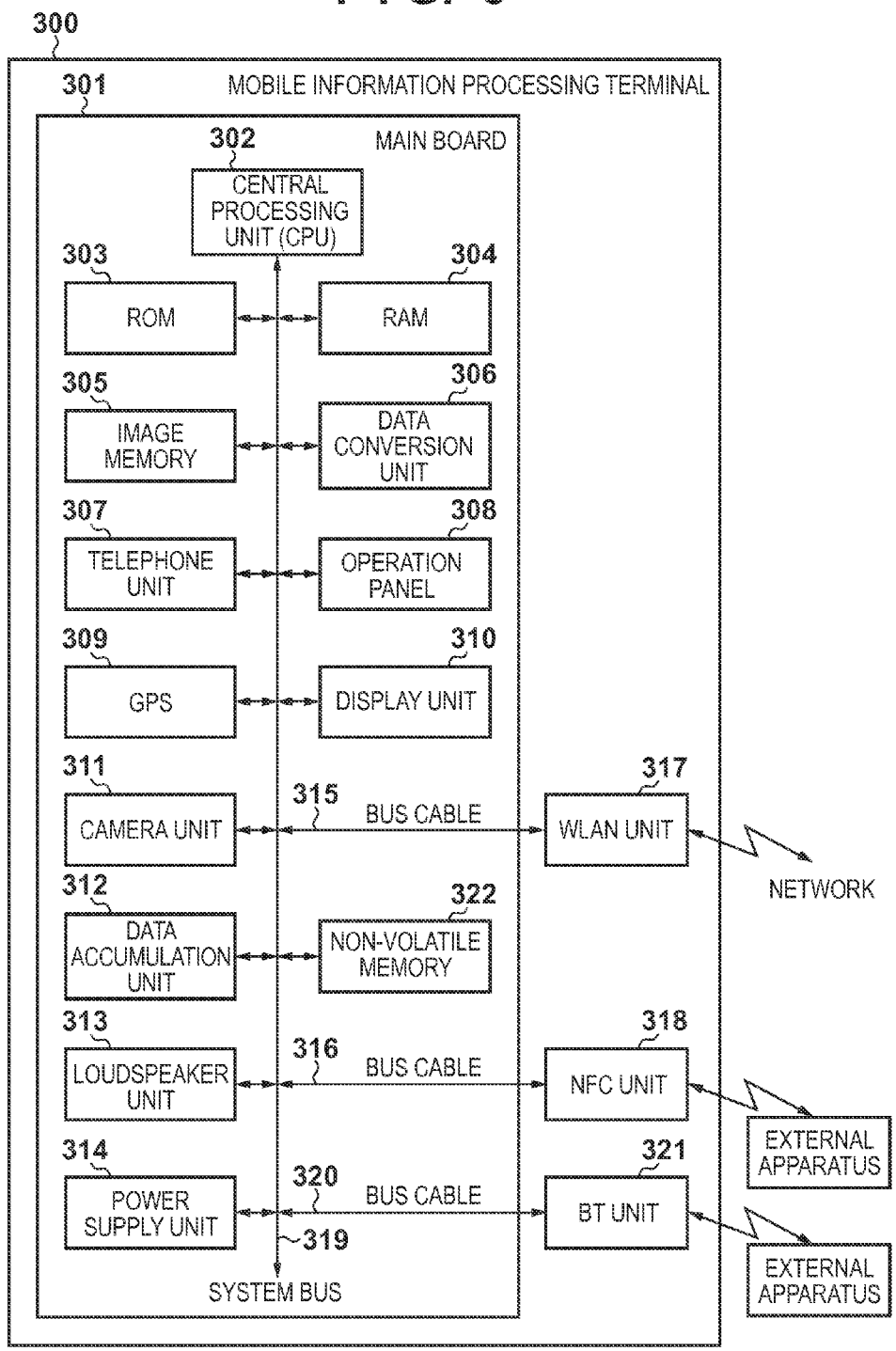
FIG. 3 is a block diagram showing a mobile information processing terminal.

FIG. 3 is a block diagram showing the mobile information processing terminal 300.

The mobile information processing terminal 300 includes a main board 301 for executing main control of the apparatus, a WLAN unit 317 for performing WLAN communication, an NFC unit 318 for performing NFC communication, and a BT unit 321 for performing Bluetooth® communication.

In the main board 301, a central processing unit (to be referred to as a CPU hereinafter) 302 serves as a system control unit to control the overall mobile information processing terminal 300. A ROM 303 stores control programs to be executed by the CPU 302, an embedded operating system (OS) program, and the like. In this embodiment, the CPU 302 executes the respective control programs stored in the ROM 303, thereby executing software control such as scheduling and task switching under the management of the embedded OS stored in the ROM 303.

A RAM 304 is implemented by an SRAM (Static RAM) or the like, stores program control variables, setting values registered by the user, management data of the mobile information processing terminal 300, and the like, and is allocated with various work buffer areas.

An image memory 305 is implemented by a DRAM (Dynamic RAM) or the like, and temporarily stores image data received via a communication unit and those read out from a data storage unit 312 so as to be processed by the CPU 302. A non-volatile memory 322 is implemented by a flash memory or the like, and stores data to be saved even after power-off. Such data include, for example, address book data and information about devices connected in the past. Note that the memory structure is not limited to this. For example, the image memory 305 and the RAM 304 may share a memory, or data may be backed up in the data storage unit 312. In this embodiment, a DRAM is used. However, the present invention is not limited to this, and a hard disk, a non-volatile memory, or the like may be used.

A data conversion unit 306 executes analysis of a page description language (PDL) and the like, and data conversion such as color conversion and image conversion. A telephone unit 307 controls a telephone line, and implements telephone communication by processing audio data input/output via a loudspeaker unit 313. An operation panel 308 includes some switches and buttons as well as a power key and a switch for detecting whether a stylus has been stored in a stylus storage unit. A GPS (Global Positioning System) 309 acquires the current latitude and longitude, and the like. A display unit 310 can display operation states, status conditions, and the like of the mobile information processing terminal 300.

A camera unit 311 has a function of electronically recording and encoding an image input via a lens. An image captured by the camera unit 311 is saved in the data storage unit 312. The data storage unit 312 can also store an image obtained as a result of operating the operation panel 308 using a stylus, and the like. For example, data such as characters and pictures drawn by the stylus 206 are stored. When the CPU 302 executes the programs in the ROM 303 or the data conversion unit 306 for the data, it is possible to, for example, extract the features or peculiarity information of characters, or recognize handwritten characters. The loudspeaker unit 313 implements a function of inputting or outputting a speech for a telephone function, and also an alarm notification function and the like. A power supply unit 314 incorporates a portable battery, and controls the battery. Power supply statuses include a battery dead status in which the battery has no remaining amount, a power-off status before the user presses the power key, an active status in which the apparatus is normally active, and a power saving status in which the apparatus is active but in a power saving mode.

The mobile information processing terminal 300 incorporates three units used to perform wireless communication, and can perform wireless communication by WLAN, NFC, and Bluetooth®. Each unit serves as a communication unit for performing data communication with another device such as an MFP. Each communication unit converts data into packets, and transmits the packets to the other device. Conversely, each communication unit converts packets coming from another external device into data, and transmits the data to the CPU 302. The WLAN unit 317, NFC unit 318, and BT unit 321 are connected to a system bus 319 via bus cables 315, 316, and 320, respectively. The WLAN unit 317, NFC unit 318, and BT unit 321 are units each used to attain communication complying with its standard. Furthermore, in this embodiment, it is possible to detect the distance to an external apparatus using the NFC unit 318. Note that the NFC unit 318 is substantially the same as the NFC unit 126 of the MFP 100.

The respective components 303 to 314, 317, 318, 321, and 322 are connected to each other via the system bus 319 managed by the CPU 302.

Figure 4:
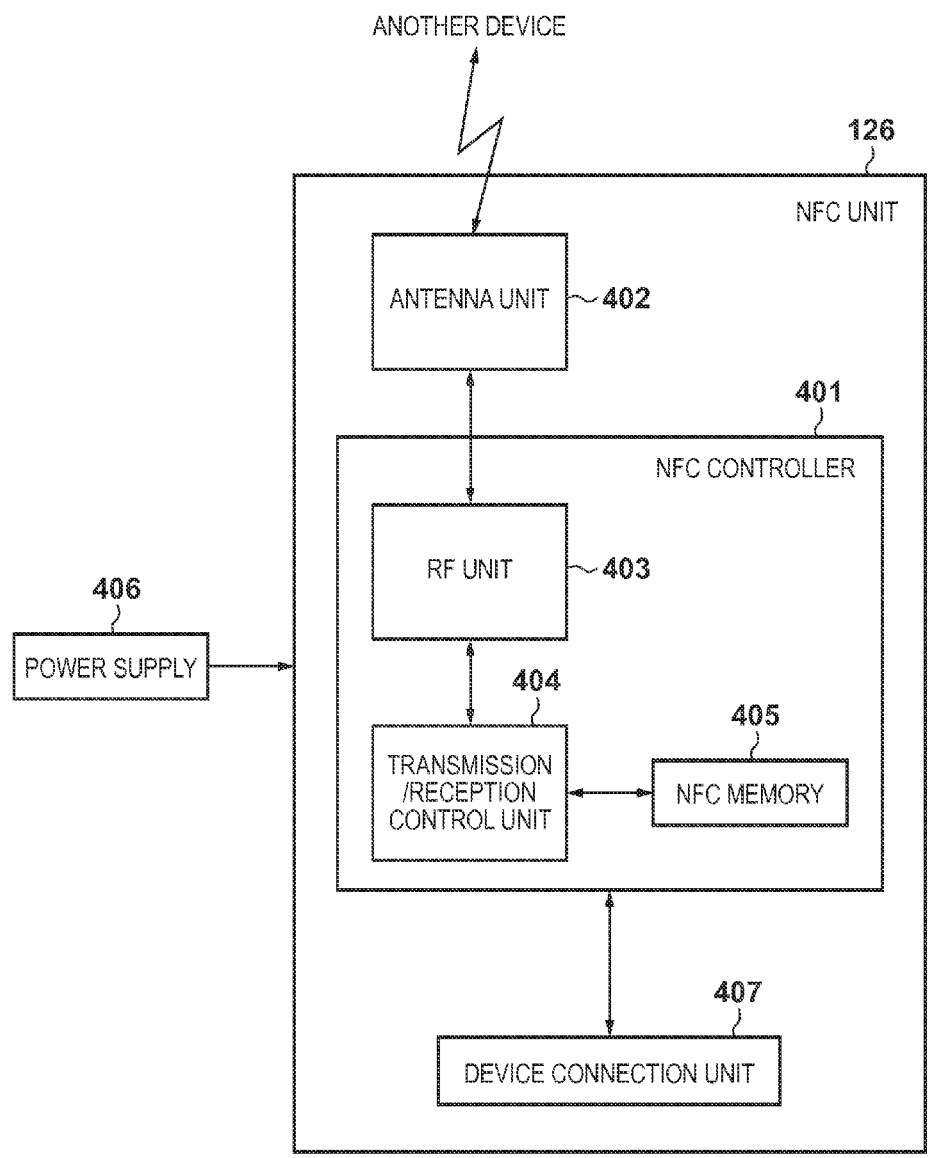
FIG. 4 is a block diagram showing an NFC unit.

FIG. 4 is a block diagram for explaining details of an NFC unit used as the NFC unit 126 of the MFP 100. The same applies to the NFC unit 318 of the mobile information processing terminal 300 and a description thereof will be omitted.

The NFC unit 126 includes an NFC controller unit 401, an antenna unit 402, an RF unit 403, a transmission/reception control unit 404, an NFC memory 405, a power supply 406, and a device connection unit 407. The antenna unit 402 receives/transmits radio waves or carriers from/to another NFC device. The RF unit 403 has a function of modulating/demodulating an analog signal into/from a digital signal. The RF unit 403 includes a synthesizer, and controls bands and channels based on frequency assignment data by identifying the frequencies of the bands and channels. The transmission/reception control unit 404 executes control associated with transmission/reception, such as assembling and disassembling of a transmission/reception frame, preamble addition and detection, and frame identification. The transmission/reception control unit 404 also controls the NFC memory 405 to read/write various data and programs. When the NFC unit operates in an active mode, it receives power via the power supply 406 to communicate with a device via the device connection unit 407 and to communicate with another NFC device located within a communicable range by carriers transmitted/received via the antenna unit 402. When the NFC unit operates in a passive mode, it receives carriers from another NFC device via the antenna to receive power from the other NFC device by electromagnetic induction, and transmits/receives data by performing communication with the other NFC device by modulating carriers.

NFC communication will now be described. An apparatus which starts communication by first outputting an RF (Radio Frequency) field when performing short distance communication by an NFC unit will be referred to as an initiator. An apparatus which communicates with the initiator in response to an instruction issued by the initiator will be referred to as a target.

The communication mode of the NFC unit includes a passive mode and active mode. In the passive mode, a target responds to an instruction of an initiator by performing load modulation. On the other hand, in the active mode, the target responds to an instruction of the initiator by an RF field generated by the target itself.

FIG. 5 is a sequence chart showing a sequence of performing data exchange in the passive mode. A case will now be described in which a first NFC unit 501 operates as an initiator, and a second NFC unit 502 operates as a target.

In step S501, the first NFC unit 501 performs single-device detection and specifies the second NFC unit 502. In step S502, the first NFC unit 501 transmits the identifier of its own, the bit transmission rate of transmission/reception, the effective data length, and the like as an attribute request. The attribute request has general purpose bytes which can be arbitrarily selected and used. Upon receiving an effective attribute request, the second NFC unit 502 transmits an attribute response in step S503. Transmission from the second NFC unit 502 is done by load modulation. Data transmission by load modulation is represented by a dotted arrow in FIG. 5.

After confirming an effective attribute response, the first NFC unit 501 can change the parameters of the subsequent transmission protocol by transmitting a parameter selection request in step S504. Parameters included in the parameter selection request are the transmission rate and the effective data length. Upon receiving an effective parameter selection request, the second NFC unit 502 transmits a parameter selection response in step S505, thereby changing the parameters. Note that steps S504 and S505 may be omitted if the parameter change is not to be performed.

In step S506, the first NFC unit 501 and the second NFC unit 502 exchange data by a data exchange request and a data exchange response. At the time of transmitting the data exchange request and the data exchange response, information for an application of the communication partner or the like can be transmitted as data. If the data size is large, the data can be divisionally transmitted.

Upon completion of data exchange, the process advances to step S507, and the first NFC unit 501 transmits one of a selection cancel request and a release request. When the first NFC unit 501 transmits the selection cancel request, the second NFC unit 502 transmits a selection cancel response in step S508. Upon receiving the selection cancel response, the first NFC unit 501 releases the attributes representing the second NFC unit 502, and the process returns to step S501. When the first NFC unit 501 transmits the release request, the second NFC unit 502 transmits a release response in step S508, thereby returning to the initial status. Upon receiving the release response, the first NFC unit 501 may return to the initial status because the target is completely released.

Figure 6B:
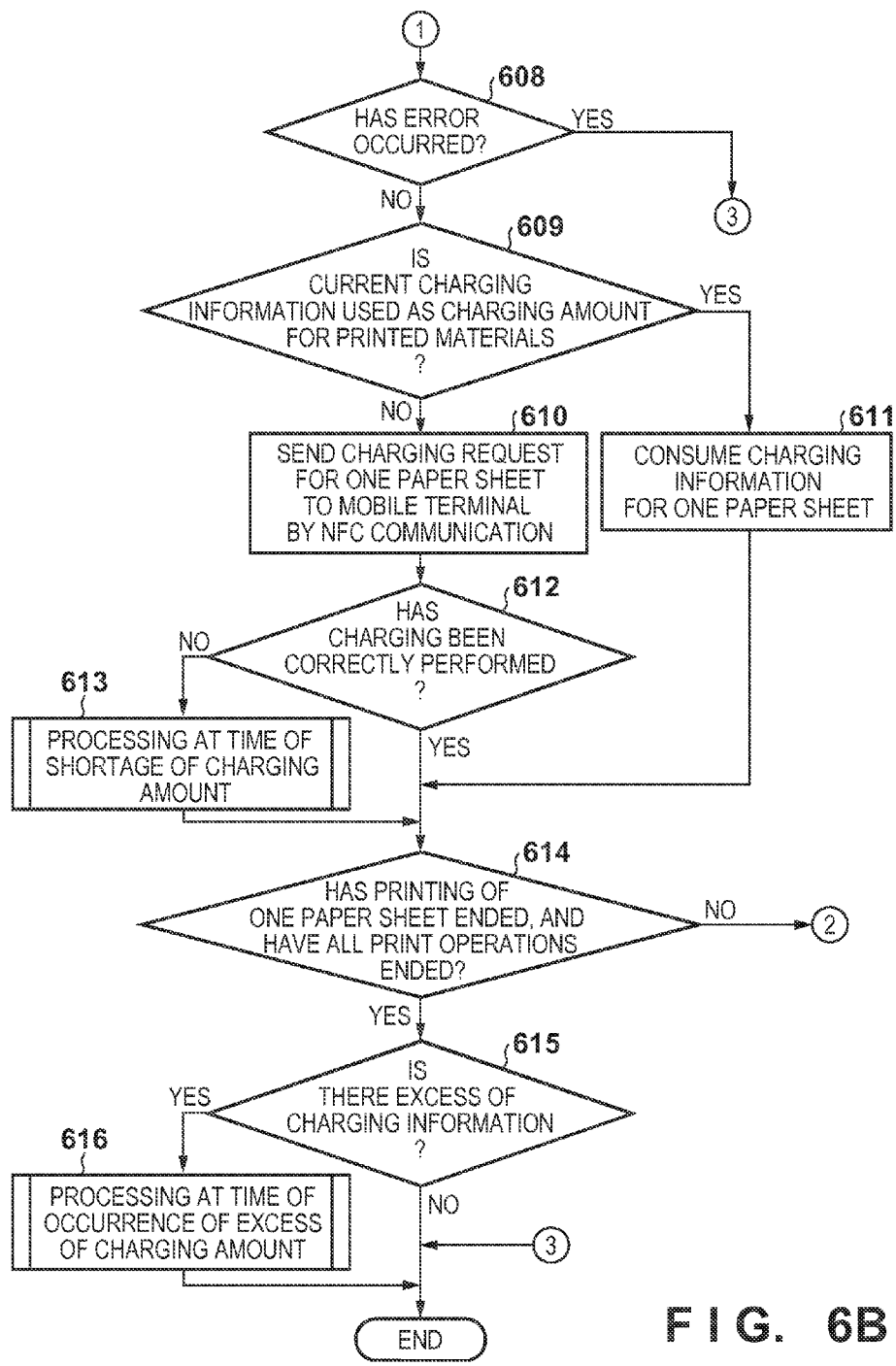

FIGS. 6A and 6B show an example of a sequence executed by the MFP 100 for executing printing and charging processing. In this embodiment, the sequence is implemented by a system formed from the MFP 100 and mobile information processing terminal 300. However, FIGS. 6A and 6B are flowcharts illustrating processing executed by the CPU 103 of the MFP 100. This sequence indicates a sequence from when the MFP 100 receives a print instruction until printing ends. This sequence includes exchange of charging information with the mobile information processing terminal 300, and processing of an excess of the charging amount after the end of printing. Note that the ROM 104 stores a program corresponding to the processing shown in FIGS. 6A and 6B. When the CPU 103 executes the program on the RAM 105, the processing shown in FIGS. 6A and 6B is executed.

In step 601, the CPU confirms whether a print instruction has been received. In this embodiment, a case in which a print instruction is received from the mobile information processing terminal 300 will be explained. If the CPU determines in step 601 that a print start instruction has been received from the mobile information processing terminal 300, the process advances to step 602. If no print instruction has been received, the CPU enters a print instruction standby status in step 601 of the sequence. In step 602, the CPU makes confirmation before printing. In this confirmation processing, instructed print information is verified to verify whether the MFP 100 can execute printing. In addition to the print data, the CPU confirms consumables and the like required for printing, such as the ink consumption amount and the remaining number of paper sheets of the MFP 100. The process advances to step 603, and the CPU determines whether printing instructed in step 601 is possible. If printing is possible, the process advances to step 604. Alternatively, if printing is impossible, printing is not executed, thereby terminating the sequence. In this case, the MFP 100 executes no printing.

In step 604, the CPU 103 confirms charging information. In this system, since charging is performed for printing, information indicating whether charging has been performed is confirmed before printing. In this embodiment, when a print instruction is issued in step 601, charging information can be sent together. By transmitting the identification information of the mobile information processing terminal 300 which has transmitted a print job, it is possible to verify whether the same mobile information processing terminal 300 is charged, when performing charging later. In this embodiment, a method of confirming the identity of a mobile information processing terminal which is charged and an information processing terminal which issues a print instruction is not adopted. If, however, the identity of the mobile information processing terminals is confirmed, it is possible to confirm the identity based on the information acquired in step 601.

The CPU confirms in step 605 whether the charging information indicates 0 (for example, the mobile information processing terminal 300 has no balance of electronic money), and the mobile information processing terminal 300 cannot perform NFC communication. This is done for the following reason. That is, when printing is to start, if there is charging information at the time of printing, it is possible to execute printing by consuming the charging information. If, however, the charging information indicates 0, charging processing is performed by short distance communication at the start of printing, and thus it is necessary to detect in advance a target to undergo charging processing. If YES is determined, there is no consumable charging information and no charging can be performed using NFC communication. Therefore, the process advances to step 607 without executing printing, thereby displaying a warning. The sequence then ends.

On the other hand, if NO is determined in step 605, there is charging information consumable in charging processing or the MFP is communicable with the mobile information processing terminal 300 which can be charged, and thus printing of one paper sheet starts in step 606. Although printing of one paper sheet starts in this example, this indicates printing of a smallest unit of charging in a broad sense. In this embodiment, charging processing is performed every time one paper sheet is printed. Therefore, printing of one paper sheet starts in this example. In step 608, the CPU confirms whether an error has occurred. If an error has occurred during printing, the sequence ends. Although in this system, no charging processing is performed if an error has occurred, error determination may be made after charging is performed. Since this depends on the service providing method of the charging system, the present invention is not limited to this and any method which satisfies the arrangement and effects of this embodiment may be used.

On the other hand, if no error occurrence is detected in step 608, a method to be used to charge for printed materials currently being printed is determined in step 609. If the charging information confirmed in step 604 does not indicate 0 and includes chargeable amount information (balance), the CPU determines in step 609 to use the current charging information, and then the process advances to step 611. In step 611, the charging information is consumed for printing of one paper sheet, and the process advances to step 614. On the other hand, if the CPU determines in step 609 that the balance is short or no balance remains based on the current charging information, the process advances to step 610 to perform charging by short distance wireless communication. In step 612, the CPU confirms whether charging has been correctly performed. If charging has been correctly performed, the process advances to step 614; otherwise, the process advances to step 613, and processing at the time of a shortage of the charging amount is performed. The processing at the time of a shortage of the charging amount will be described in detail later with reference to FIG. 8. After that, the process advances to step 614.

In step 614, the CPU determines whether printing of one paper sheet started in step 606 has ended, and all instructed print operations have ended. If not all the print operations have ended, charging information is confirmed again in step 604 to execute next printing. On the other hand, if all the print operations have ended, the process advances to step 615, and the CPU confirms whether there is an excess of the charging information remaining in the apparatus. If there is no excess of the charging information, the sequence ends; otherwise, the process advances to step 616, and processing at the time of occurrence of an excess of the charging amount is performed. The processing at the time of occurrence of an excess of the charging amount is performed in step 616 and a detailed description thereof will be provided later with reference to FIG. 9. The sequence then ends.

The behavior of the MFP 100 when charging the mobile information processing terminal 300 while executing printing can be described according to the method shown in FIGS. 6A and 6B.

Note that in this embodiment, a sequence which does not ensure a match between a mobile information processing terminal which has issued a print job and that which is charged is performed, as described above. However, even if a match between a mobile information processing terminal which has issued a print job and that which is charged is required, the same sequence can be performed by acquiring the individual information of the mobile information processing terminal, and confirming the individual information together when determining whether charging can be performed in step 605 or 612.

Figure 7:
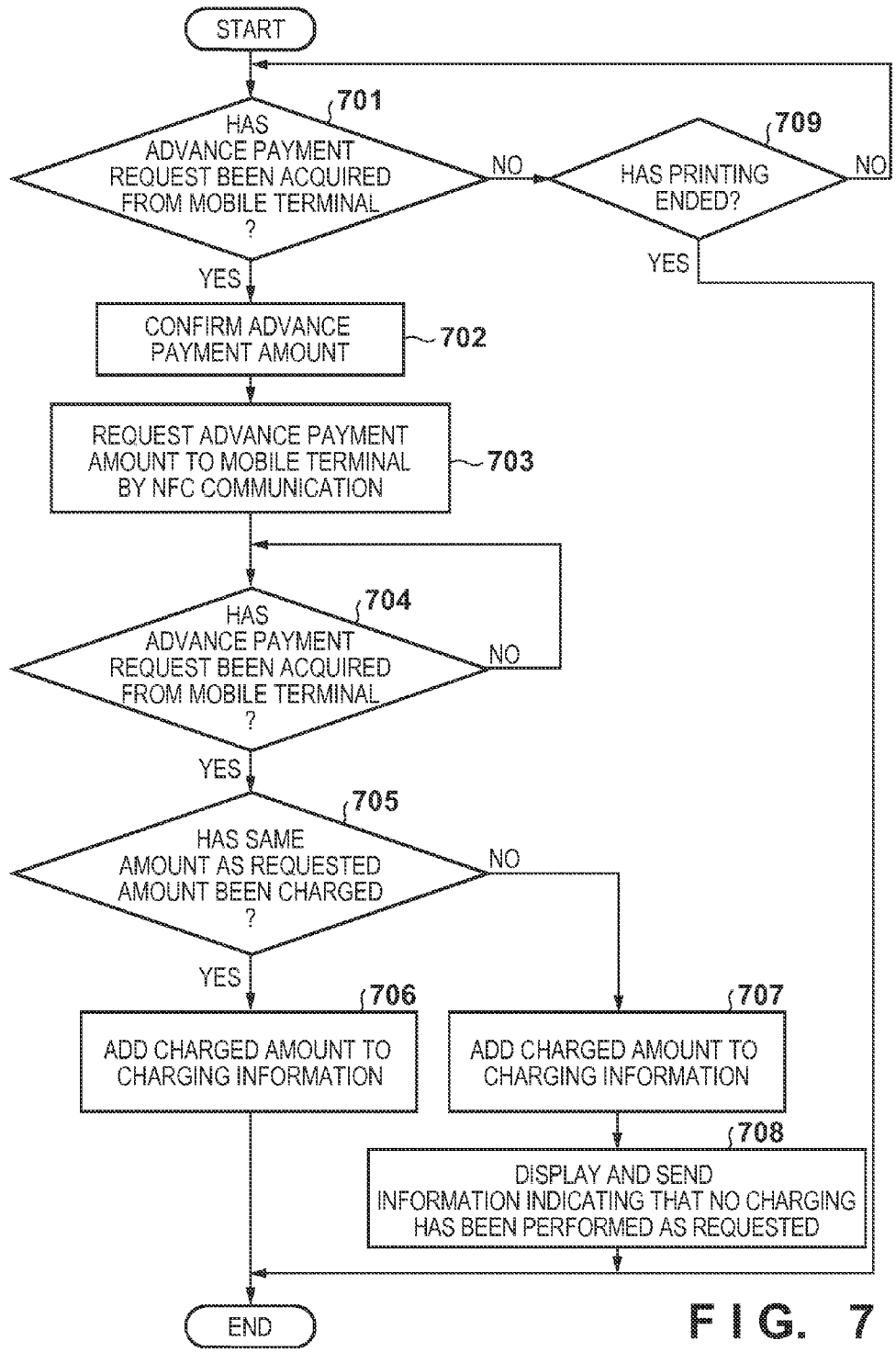
FIG. 7 is a flowchart illustrating a sequence executed by the printing apparatus for performing processing associated with advance payment charging processing.

FIG. 7 shows an example of a sequence executed by the MFP 100 for performing processing associated with advance payment charging processing.

In addition to the sequence shown in FIGS. 6A and 6B, the MFP 100 of this embodiment can receive and process an advance payment request from the mobile information processing terminal 300. Similarly to the print request, the advance payment request is sent from the mobile information processing terminal by short distance wireless communication. Although the same embodiment is adopted, the sequences shown in FIGS. 6A, 6B and 7 can be simultaneously performed.

In step 701, the MFP determines whether a request to pay in advance a charging amount for printing has been acquired from the mobile information processing terminal 300. If the MFP has received no advance payment request, it confirms in step 709 whether printing has ended, and the process returns to step 701. If the MFP determines in step 701 to have acquired an advance payment request from the mobile information processing terminal 300, the process advances to step 702. Note that the acquired advance payment request includes an amount to be paid in advance, advance payment information, and information for specifying the mobile information processing terminal with which communication is to be performed. In step 702, an advance payment amount is confirmed from the advance payment information acquired in step 701. There may be some kinds of processes for advance payment of the charging amount depending on the information coming from the mobile information processing terminal 300. If the advance payment information includes information of an amount to be charged, the information is used intact as an advance payment amount in step 702. Alternatively, if the time during which the user wants to temporarily move the mobile information processing terminal 300 outside the NFC communicable range is acquired from the advance payment information, it is possible to calculate an amount in consideration of the time and the print speed of the MFP 100. As described above, there exist some kinds of processes in step 702. An advance payment amount to be requested to the mobile information processing terminal 300 is decided by performing calculation based on the advance payment information acquired in step 701 and the information of the MFP 100. In step 703, the MFP requests the requested advance payment amount decided in step 702 to the mobile information processing terminal 300 using the NFC unit 126. In step 704, the MFP determines whether the advance payment request issued in step 703 has been correctly made. The MFP stands by in step 704 until the request is correctly made. If the request is correctly made, the MFP determines in step 705 whether the same amount as the requested amount has been charged.

Since whether the mobile information processing terminal 300 can always pay the advance payment amount requested in step 704 is uncertain, the result is determined in step 705. This processing will be described later with reference to FIG. 12. If charging is performed as requested by the MFP 100, the process advances to step 706, and the charged amount is added to the charging information. The added charging information is charging information confirmed in step 604 of FIG. 6A or the like. When the charging amount increases according to this sequence, the charging information can be confirmed in step 604 of FIG. 6A, and used in steps 609 and 611 in FIG. 6B and the like. If it is determined in step 705 that the same amount as the requested amount could not be charged, the process advances to step 707. Similarly to step 706, the charged amount is added to the charging information in step 707. Since, however, the amount is not equal to that requested by the MFP 100, it is uncertain whether the mobile information processing terminal 300 can leave the area of short distance wireless communication for the intended time. Consequently, information indicating that no charging has been performed as requested is displayed on the display unit 111 of the MFP 100 in step 708. Furthermore, the mobile information processing terminal 300 is notified, by using the NFC unit 126, that no charging has been performed as requested, and the information is sent so that the mobile information processing terminal 300 can send a notification.

As described above, when the MFP 100 receives an advance payment request from the mobile information processing terminal 300, it can process the advance payment request according to this sequence. In a system configuration of combining this sequence and a sequence shown in FIG. 10 (to be described later), it is possible to build a basic system for processing of advance payment of a charging amount according to this embodiment.

Note that this sequence is implemented by a sequence which does not ensure a match between a mobile information processing terminal which has issued a print job and that which is charged, similarly to FIGS. 6A and 6B. However, even if a match between a mobile information processing terminal which has issued a print job and that which is charged is required, the same sequence can be performed by acquiring the individual information of the mobile information processing terminal, and confirming the individual information together at the time of the determination processing in step 701.

Figure 8:
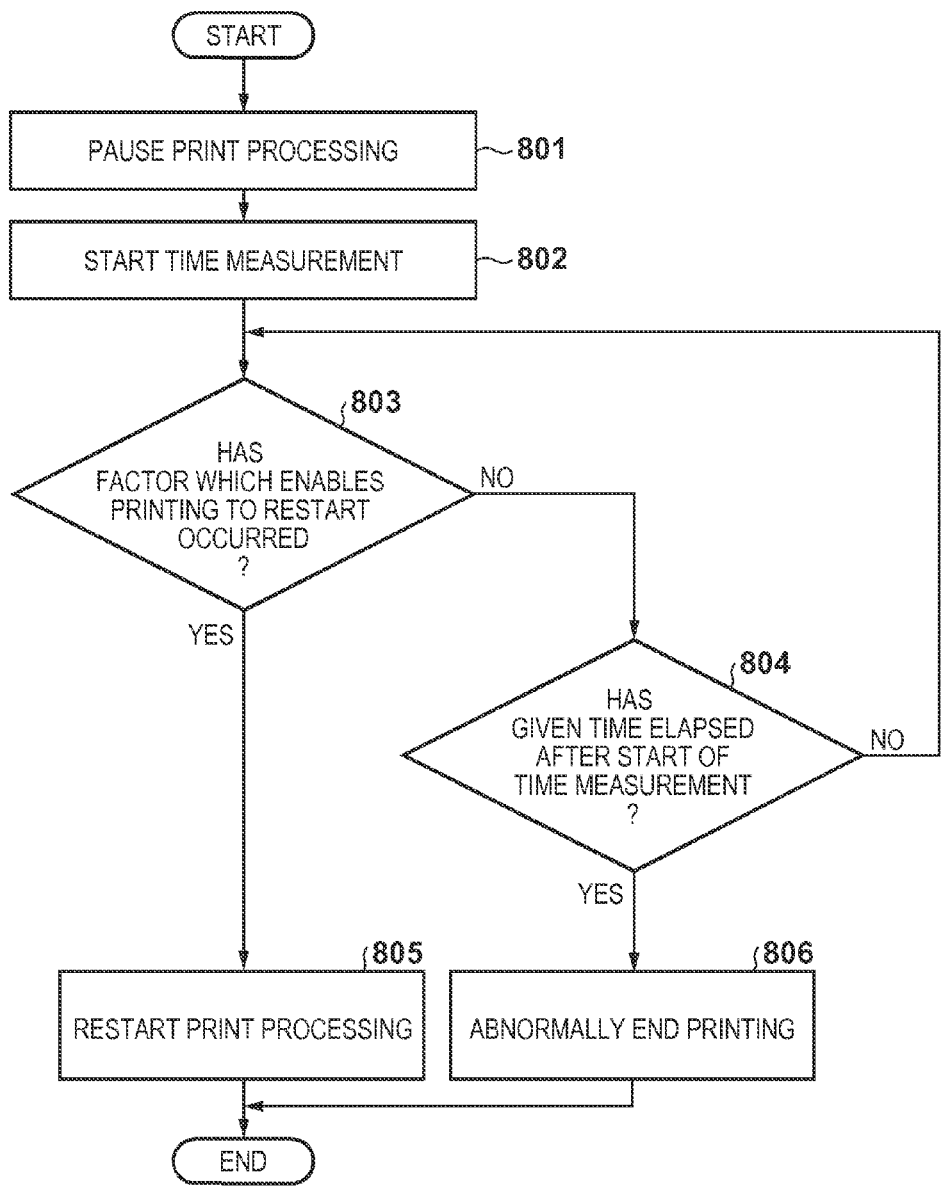
FIG. 8 is a flowchart illustrating a sequence executed by the printing apparatus when a shortage of a charging amount for printing occurs.

FIG. 8 shows an example of a sequence executed by the MFP 100 when a shortage of the charging amount for printing occurs. FIG. 8 shows details of the processing sequence executed by the printing apparatus when a shortage of the charging amount occurs, which has been described in step 613 of FIG. 6B.

In step 801, print processing by the MFP 100 is paused. This is done because when no charging request is issued, executing printing is in vain. Time measurement starts in step 802. This serves as a unit of performing determination in step 804, and serves as a timer for canceling printing itself when a given period elapses in the pause status. The process advances to step 803, and the MFP confirms whether a factor which enables printing to restart has occurred. More specifically, the factor which enables printing to restart corresponds to a case in which the mobile information terminal which can be charged becomes communicable via the NFC unit 126 or a case in which it is recognized that an amount has been added to the charging information and the resultant charging information includes an amount which allows printing. If printing can restart, the process advances to step 805 to restart print processing, thereby terminating the sequence. If the sequence ends after step 805, it can be determined in step 614 of FIG. 6B that printing has not ended, and the print processing can restart from a point where the print processing has been paused before. On the other hand, if it is determined in step 803 that no factor which enables printing to restart has occurred, it is determined in step 804 whether the given time has elapsed, in accordance with time measurement started in step 802. If the given time has not elapsed, determination is performed again in step 803. On the other hand, if it is determined that the given time has elapsed, printing abnormally ends in step 806. If the sequence ends after step 806, it is determined in step 614 of the sequence shown in FIG. 6B that printing has ended.

As described above, by executing processing when a shortage of the charging amount occurs, it is possible to prevent unnecessary printing at the time of a shortage of the charging amount. Furthermore, if an unintended shortage of the charging amount occurs, a restart unit for handling such situation can be provided together.

Figure 9:
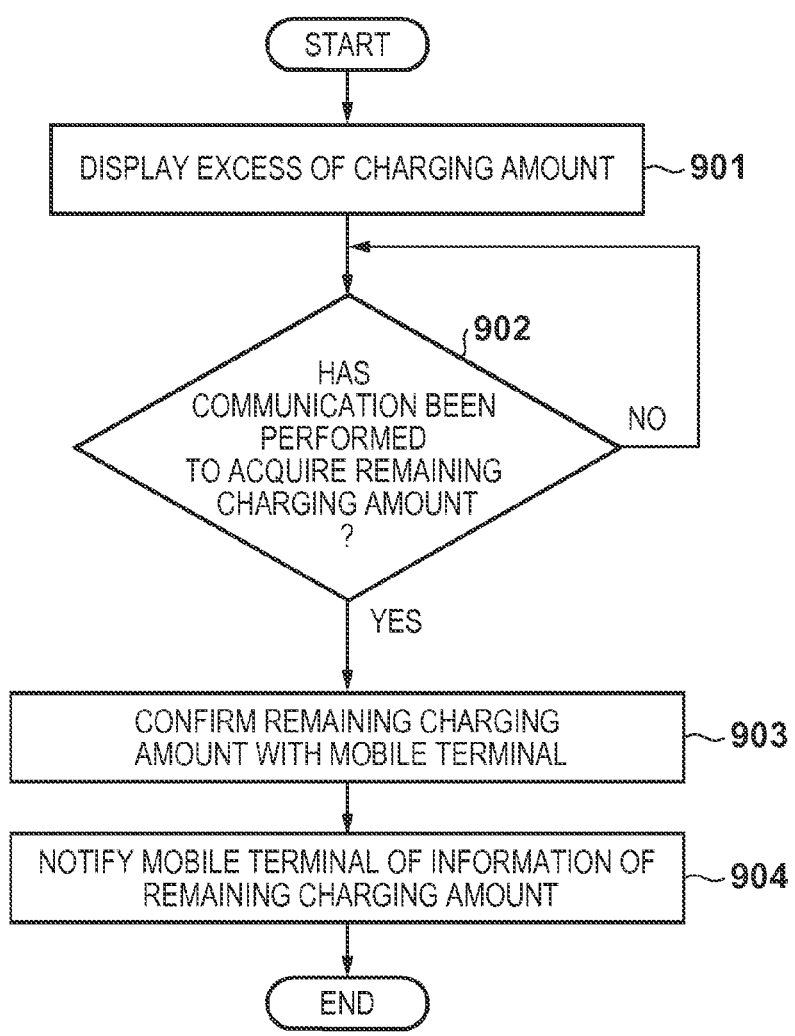
FIG. 9 is a flowchart illustrating the sequence of the behavior of the printing apparatus when an excess of charging information occurs after the end of printing.

FIG. 9 shows an example of a sequence showing the behavior of the MFP 100 when an excess of the charging information occurs after the end of printing. This sequence shows details of the processing at the time of occurrence of an excess of the charging amount in step 616 shown in FIG. 6B.

In step 901, an excess of the charging amount is displayed. This is done since the MFP 100 needs to notify the user that there is still the usable charging information after the end of printing. In step 902, the MFP determines whether communication has been performed to acquire the remaining charging amount. This processing is communication confirmation to notify the mobile information processing terminal side of the remaining amount. In step 903, the remaining charging amount is confirmed with the mobile terminal. This confirmation processing includes confirmation that the individual information of the mobile information processing terminal at the time of charging coincides with that in communication performed in step 902. Only the mobile information processing terminal which has been charged can acquire the remaining charging information. In step 904, the MFP notifies the mobile information processing terminal of information of the remaining charging amount. The sequence then ends.

In this embodiment, the MFP does not refund the remaining charging amount to the mobile information processing terminal, and notifies the mobile information terminal of only information of the remaining amount. As a use case, assume that after the mobile information terminal acquires the information of the remaining amount, the user asks a store or the like to refund the excess of the charging information displayed on the mobile information terminal. In the system configuration of this embodiment, therefore, the mobile information processing terminal can perform charging payment processing for the MFP 100 but the MFP 100 refunds no charging information to the mobile information processing terminal. Note that to implement the arrangement requirements and effects of this embodiment, the present invention is not limited to this system configuration, and any method in which the MFP 100 notifies the mobile information terminal of the remaining charging information may be used. Alternatively, the MFP 100 may notify the mobile information terminal of the excess of the charging information by NFC communication, and the excess may be added in the mobile information terminal.

Figure 10:
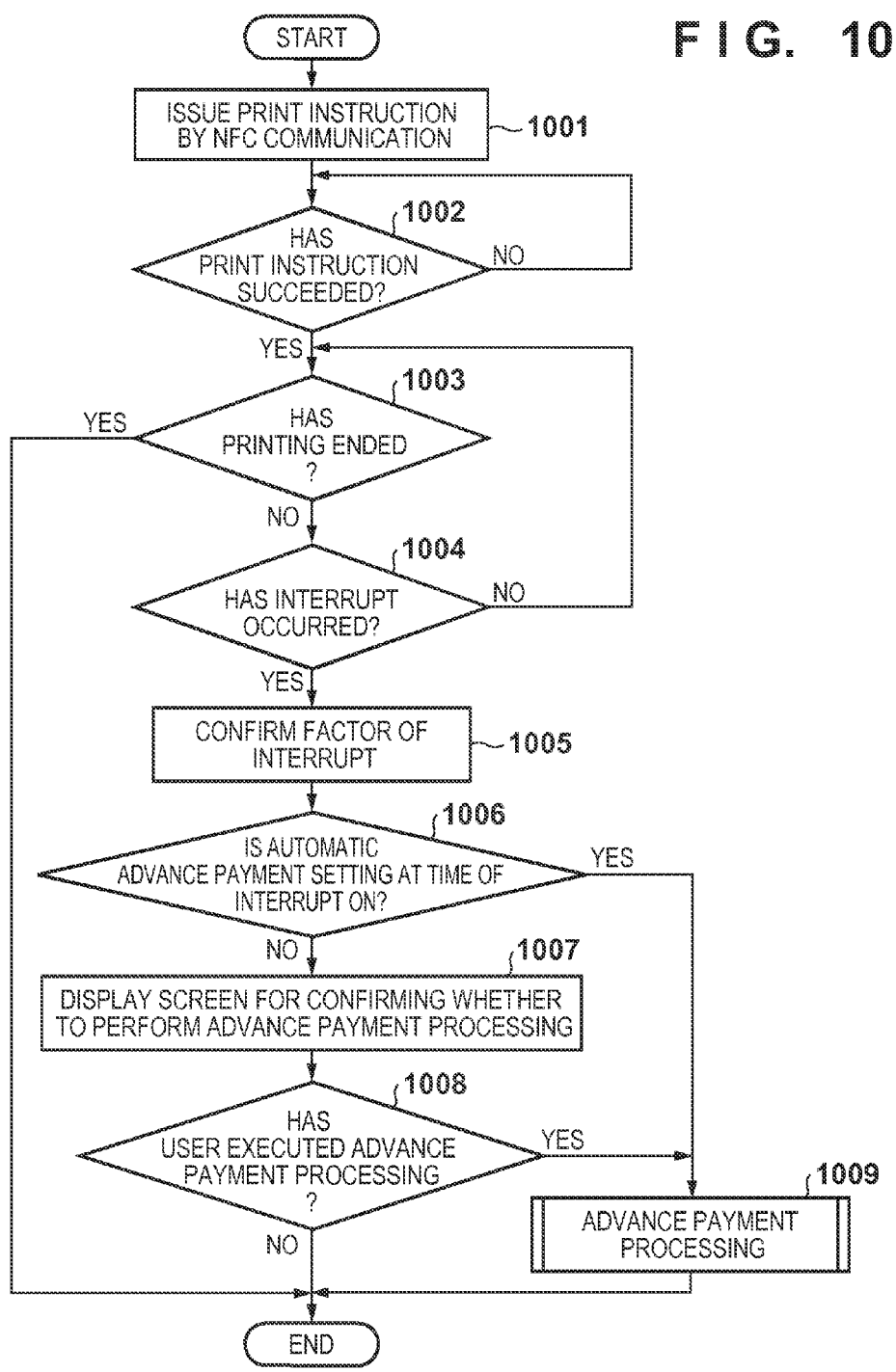
FIG. 10 is a flowchart illustrating a sequence executed by the mobile information processing terminal for performing printing and charging processing.

FIG. 10 shows an example of a sequence executed by the CPU 302 of the mobile information processing terminal 300 for performing printing and charging processing. Note that the ROM 303 stores a program corresponding to the processing shown in FIG. 10. When the CPU 302 executes the program on the RAM 304, the processing shown in FIG. 10 can be implemented.

Contrary to the sequences of FIGS. 6A, 6B and 7 executed by the MFP 100, this sequence is a processing sequence executed by the CPU 302 of the mobile information processing terminal 300. When, therefore, the MFP 100 operates according to the sequences shown in FIGS. 6A, 6B and 7 and the mobile information processing terminal 300 operates according to the sequence shown in FIG. 10, it is possible to confirm the effects of this embodiment.

In step 1001, the CPU 302 of the mobile information processing terminal 300 issues a print instruction to the MFP 100 using the NFC unit 318. In fact, after the user decides information to be printed in the mobile information processing terminal 300, and gets ready to perform printing, he/she moves the mobile information processing terminal 300 close to the NFC unit 126 of the MFP 100 to perform NFC communication, thereby issuing a print instruction. This print instruction indicates information such as an image to be printed, and print conditions such as the number of copies. Alternatively, the print instruction may indicate the location (URL) of the information to be printed.

In step 1002, the CPU determines whether the print instruction has succeeded, and stands by for confirmation. The process advances to step 1003. In step 1003, the CPU determines whether printing has ended. If printing has not ended, the process advances to step 1004; otherwise, the sequence ends. In step 1004, the CPU determines whether an interrupt has occurred. The interrupt mainly indicates a factor which requires performing an operation by moving the mobile information processing terminal 300 away from the NFC unit capable of performing NFC communication with the MFP 100. Since the mobile information processing terminal 300 according to this embodiment is, for example, a smartphone, this interrupt processing indicates the occurrence of a predetermined event which requires operating the mobile information processing terminal, such as reception of an incoming call from a line network, the arrival of email, and activation of an internal application. Note that the above-described interrupt factors are examples, and the present invention is not limited to them.

If the print instruction has succeeded, the CPU confirms in step 1003 whether printing has ended. In fact, there is time during which the MFP 100 executes printing while repeating steps 1003 and 1004. During this time, the MFP 100 executes printing, and the mobile information processing terminal 300 performs charging processing for printing. In this case, if charging processing is performed, charging is performed for printing according to a sequence shown in FIG. 12 (to be described later). Note that the mobile information processing terminal 300 can simultaneously process the sequence shown in FIG. 10 and the charging sequence shown in FIG. 12. This is similar to the case in which the MFP 100 can simultaneously operate the sequences shown in FIGS. 6A, 6B and 7.

If it is determined in step 1004 that an interrupt has occurred, the process advances to step 1005. In step 1005, the CPU confirms the factor of the interrupt in step 1004. This is done since the operation of the mobile information processing terminal 300 changes depending on the type of the factor. Note that advance payment processing does not change. In step 1006, the CPU determines whether an automatic advance payment setting at the time of an interrupt is ON. The automatic advance payment setting at the time of an interrupt in step 1006 is settable in a screen (to be described later with reference to FIG. 15), and setting contents are stored in the non-volatile memory. Since this setting can be made for each interrupt factor, it is possible to detect the setting based on the contents confirmed in step 1005. In this case, the CPU confirms in step 1006 whether the automatic interrupt setting is ON for the factor confirmed in step 1005. If the CPU determines in step 1006 that the automatic advance payment setting is ON, it performs advance payment processing in step 1009. The advance payment processing will be described in detail later with reference to FIG. 11. If the CPU determines in step 1006 that the automatic advance payment setting is not ON, the process advances to step 1007. In step 1007, a screen for confirming whether to perform the advance payment processing is displayed. In step 1008, the CPU determines whether the user has instructed the advance payment processing in the screen displayed in step 1007. If the user has instructed the advance payment processing, the process advances to step 1009; otherwise, the sequence ends.

In this sequence, it is possible to terminate the sequence without performing the advance payment processing. If the mobile information processing terminal 300 is moved outside the NFC communication range without making advance payment, a shortage of the charging information occurs, NFC communication becomes impossible, and thus printing stops, as shown in FIGS. 6A and 6B.

As described above, when it becomes necessary to operate the mobile information processing terminal 300 due to another interrupt factor while the mobile information processing terminal 300 needs to perform charging by NFC communication during printing, it is possible to carry the information processing terminal outside the NFC communication range by making advance payment.

Figure 11:
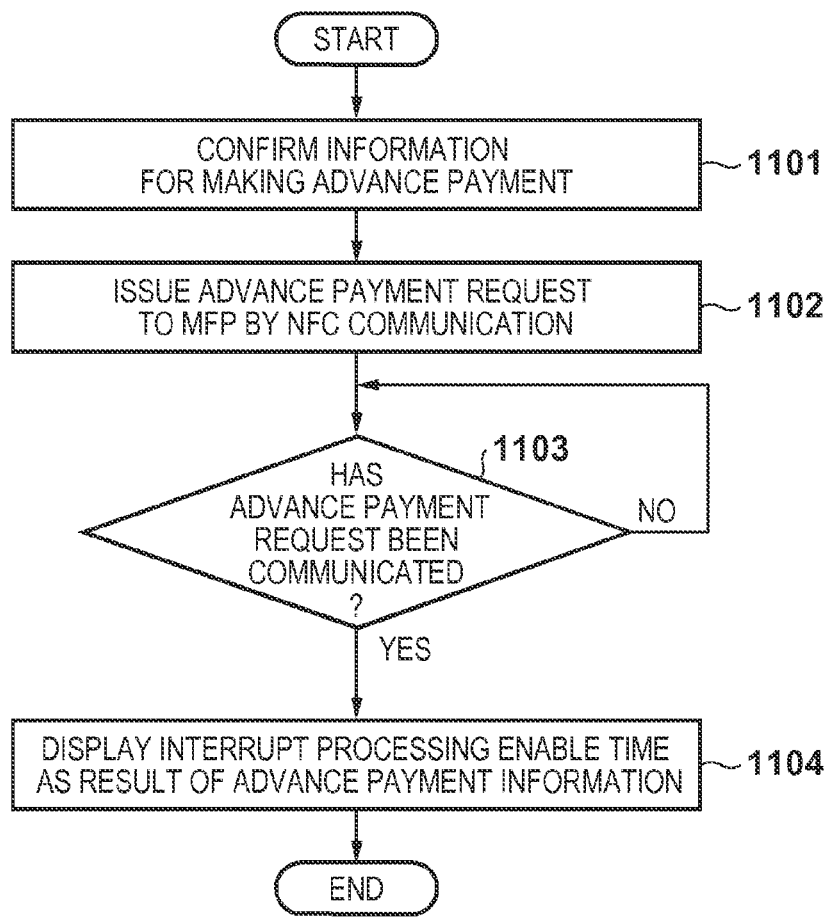
FIG. 11 is a flowchart illustrating a sequence executed by the mobile information processing terminal for performing advance payment processing.

FIG. 11 shows an example of a sequence executed by the mobile information processing terminal 300 for performing the advance payment processing. FIG. 11 is a flowchart illustrating details of the processing in step 1009 of FIG. 10.

In step 1101, the CPU confirms information for making advance payment. This information indicates an advance payment amount and a time. As shown in step 702 of FIG. 7, there are some kinds of information when advance payment is made. There are various kinds of information such as an advance payment amount, the time during which the user wants to carry the terminal outside the NFC communication range by making advance payment, and the number of paper sheets for which the user wants to make advance payment. In step 1101, advance payment information receivable by the MFP 100 is confirmed. For example, there is a method of paying in advance an amount for the remaining number of paper sheets in printing. There is another method of transferring a value such as a time to the MFP 100, and causing the MFP 100 to refund an amount. Although the above-described various methods are available, the present invention is not limited to them as long as a group of pieces of information for calculating an amount to be paid in advance is used.

In step 1102, the CPU notifies the MFP 100 of an advance payment request by NFC communication. At this time, the information confirmed in step 1101 is sent. In step 1103, the CPU determines whether the advance payment request has been communicated. Upon completion of communication, an interrupt processing enable time which has been calculated by the MFP 100 is acquired from the advance payment information in step 1103, and the time is displayed on the mobile information processing terminal 300 in step 1104. Note that this sequence only issues an advance payment request. Charging for the advance payment request is performed according to the sequence shown in FIG. 12.

Figure 12:
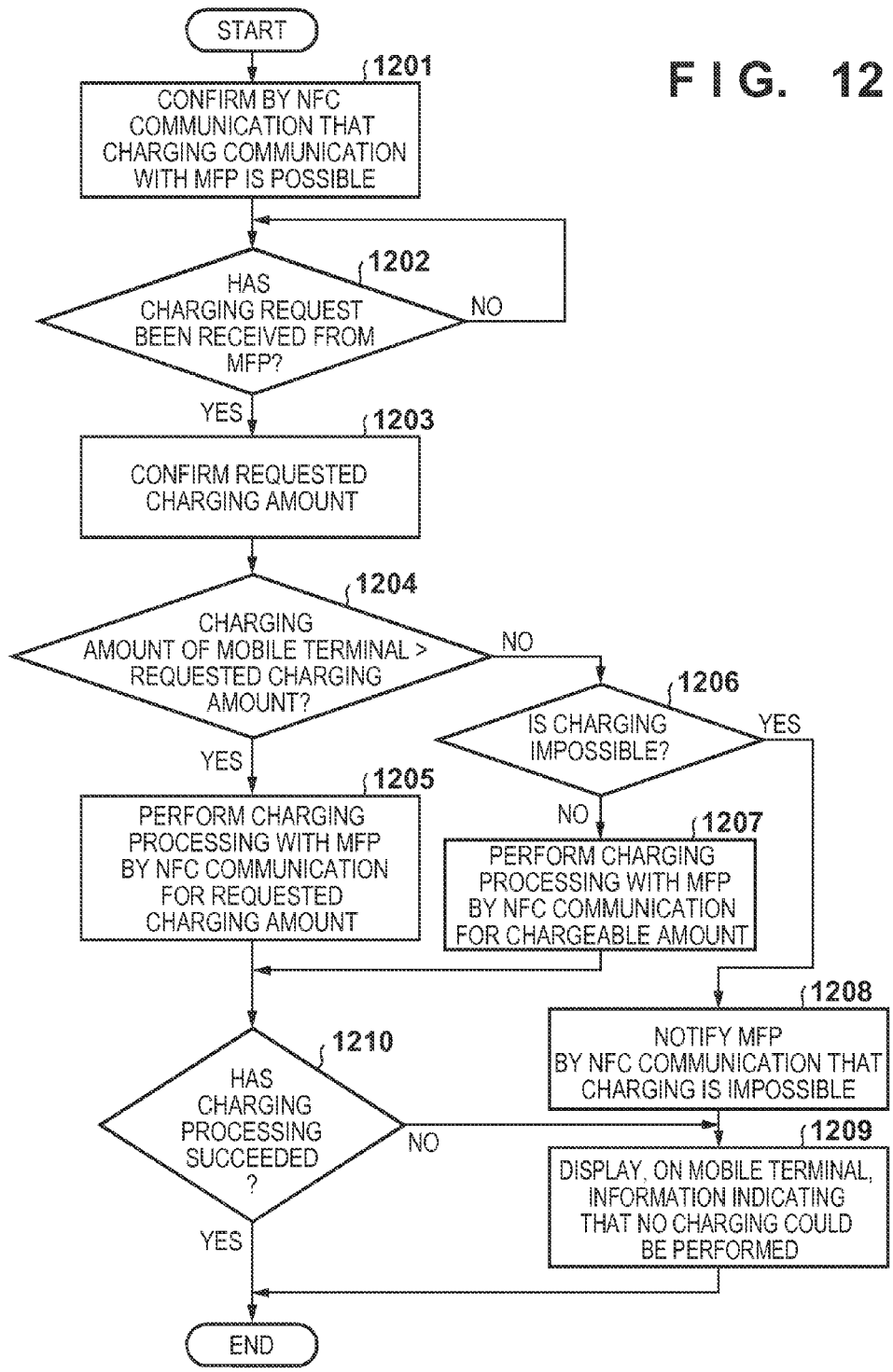
FIG. 12 is a flowchart illustrating a sequence executed by the mobile information processing terminal for performing charging processing.

FIG. 12 shows an example of a sequence by the mobile information processing terminal 300 for performing charging processing. The charging processing shown in FIG. 12 is a sequence of issuing an advance payment request and performing charging for normal printing at the same time.

In step 1201, the CPU 302 of the mobile information processing terminal 300 confirms by NFC communication that charging communication with MFP 100 is possible. In step 1202, the CPU confirms whether a charging request has been received from the MFP 100. In step 1202, the CPU stands by until a charging request is received. Upon receiving a charging request in step 1202, the process advances to step 1203. In step 1203, the CPU confirms a charging amount requested by the MFP 100. In step 1204, the CPU compares the charging amount which can be charged in the mobile information processing terminal with the requested charging amount confirmed in step 1203. If the charging amount which can be charged is larger, the CPU determines that charging can be performed as requested, and the process advances to step 1205. In step 1205, the CPU performs charging processing with the MFP 100 via NFC communication for the requested charging amount. The process advances to step 1210.

On the other hand, if the amount requested by the MFP 100 is larger, the process advances to step 1206. In step 1206, the CPU determines whether charging can be performed. In this processing, it is determined whether the requested amount cannot be charged at all or some of the requested amount can be charged. If charging is impossible, the process advances to step 1208. On the other hand, if at least some of the requested amount can be charged, the process advances to step 1207. In step 1207, the CPU performs charging processing with the MFP 100 by NFC communication for the chargeable amount. The process advances to step 1210. In step 1208 after the CPU determines in step 1206 that charging is impossible, the CPU notifies the MFP 100 by NFC communication that charging is impossible. The process advances to step 1209, and information indicating that no charging could be performed is displayed on the mobile information processing terminal.

On the other hand, if it is determined in step 1210 that the charging processing has succeeded, the sequence ends; otherwise, the process advances to step 1209, and information indicating that no charging could be performed is displayed on the mobile information processing terminal. As described above, the mobile information processing terminal performs charging processing while exchanging information with the printing apparatus by NFC communication.

Figure 13:
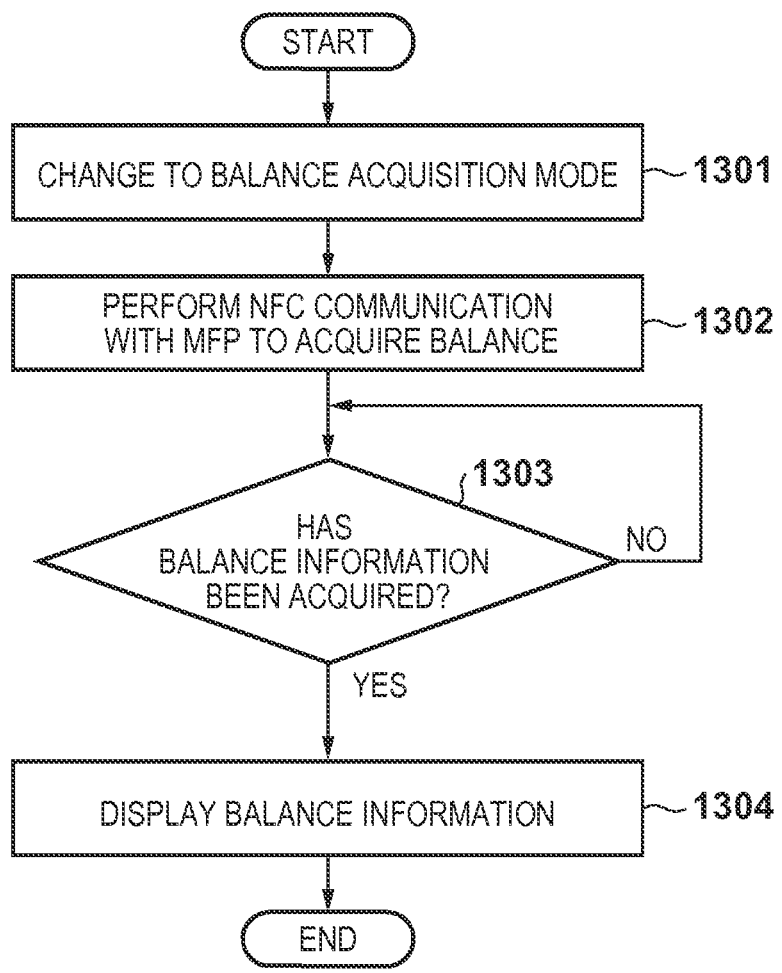
FIG. 13 is a flowchart illustrating a processing sequence executed by the mobile information processing terminal for confirming the balance when the balance remains.

FIG. 13 shows an example of a processing sequence executed by the mobile information processing terminal for confirming the balance when the balance remains. This sequence is a sequence executed by the mobile information processing terminal 300, which corresponds to the remaining charging information display sequence of FIG. 9 executed by the MFP 100.

In step 1301, the mobile information processing terminal changes the mode to a balance acquisition mode. In step 1302, the terminal performs NFC communication with the MFP 100 to acquire the balance. This communication corresponds to step 902 of FIG. 9. In step 1303, the terminal determines whether the balance information has been acquired. In this sequence, the terminal acquires the balance information from the MFP 100. If the terminal has acquired the balance information, the balance is displayed in step 1304. In this embodiment, the mobile information processing terminal only acquires the balance information by an authenticated unit, and displays it, as shown in FIG. 9. The terminal does not exchange the remaining charging amount. Assume a use case in which refund processing is additionally performed based on the information displayed on the mobile information processing terminal.

Figure 14:
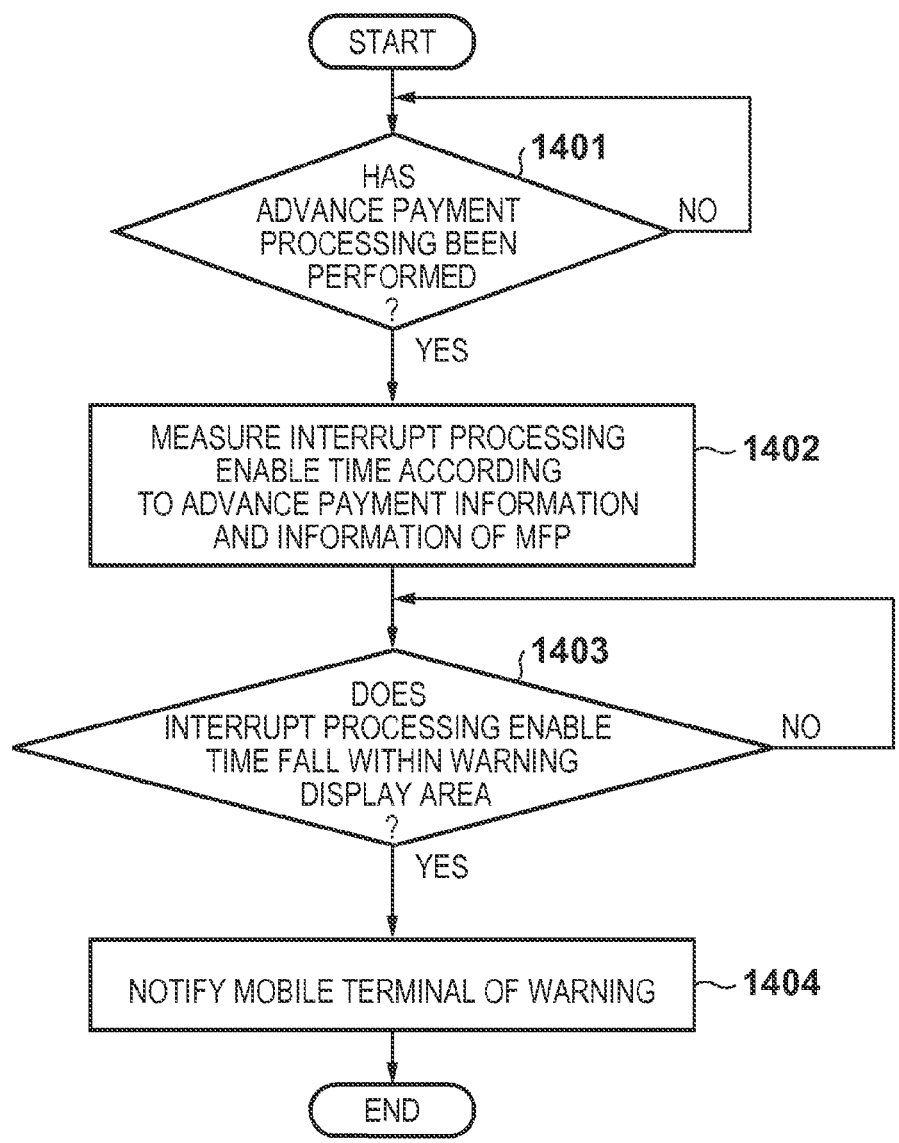
FIG. 14 is a flowchart illustrating a processing sequence of warning the mobile information processing terminal after advance payment processing.

FIG. 14 shows an example of a processing sequence of warning the mobile information processing terminal after the advance payment processing.

Even if the mobile information processing terminal is moved outside the area of NFC communication, it is possible to operate the mobile information processing terminal while continuing printing by making advance payment according to the processing shown in FIG. 13. At this time, if not all print operations ends by the amount paid in advance, it is necessary to notify the user of the time at which it is necessary to continue charging processing using NFC communication.

In step 1401, it is determined whether the advance payment processing has been performed. If it is determined that the advance payment processing has been performed, the process advances to step 1402, and an interrupt processing operable time is measured according to advance payment information and the information of the printing apparatus. If, for example, the print speed (the number of printing sheets per unit time) of the MFP 100 is 10 sheets/min, and the user has paid in advance an amount for 100 paper sheets, the mobile information processing terminal may leave from the MFP 100 for 10 min. It is, however, necessary to communicate with the mobile information processing terminal by the NFC communication unit again after 10 min, it is necessary to complete interrupt processing before that.

In step 1403, it is determined whether the interrupt processing enable time falls within a warning display area. The warning display area indicates a case in which a given time is set as a boundary and the interrupt processing enable time is shorter with respect to the boundary. If, for example, the MFP 100 performs charging processing using NFC communication when the remaining time is 1 min, the warning display area is set to 1 min, thereby performing determination. A numerical value decided for each embodiment or interrupt factor may be used as the warning display area. If it is determined in step 1403 that the interrupt processing enable time falls within the warning display area, the mobile information processing terminal is notified of a warning in step 1404. This may be implemented by displaying a warning on the display unit. A change is made depending on contents performed as an interrupt factor. For example, during voice communication by telephone, the terminal is notified of a warning of the remaining time by voice. Alternatively, while email or an application is operated, a warning is displayed on an operation screen. As described above, the present invention has as its feature to give a warning to be detectable during a currently performed operation. The sequence then ends.

Figure 15:
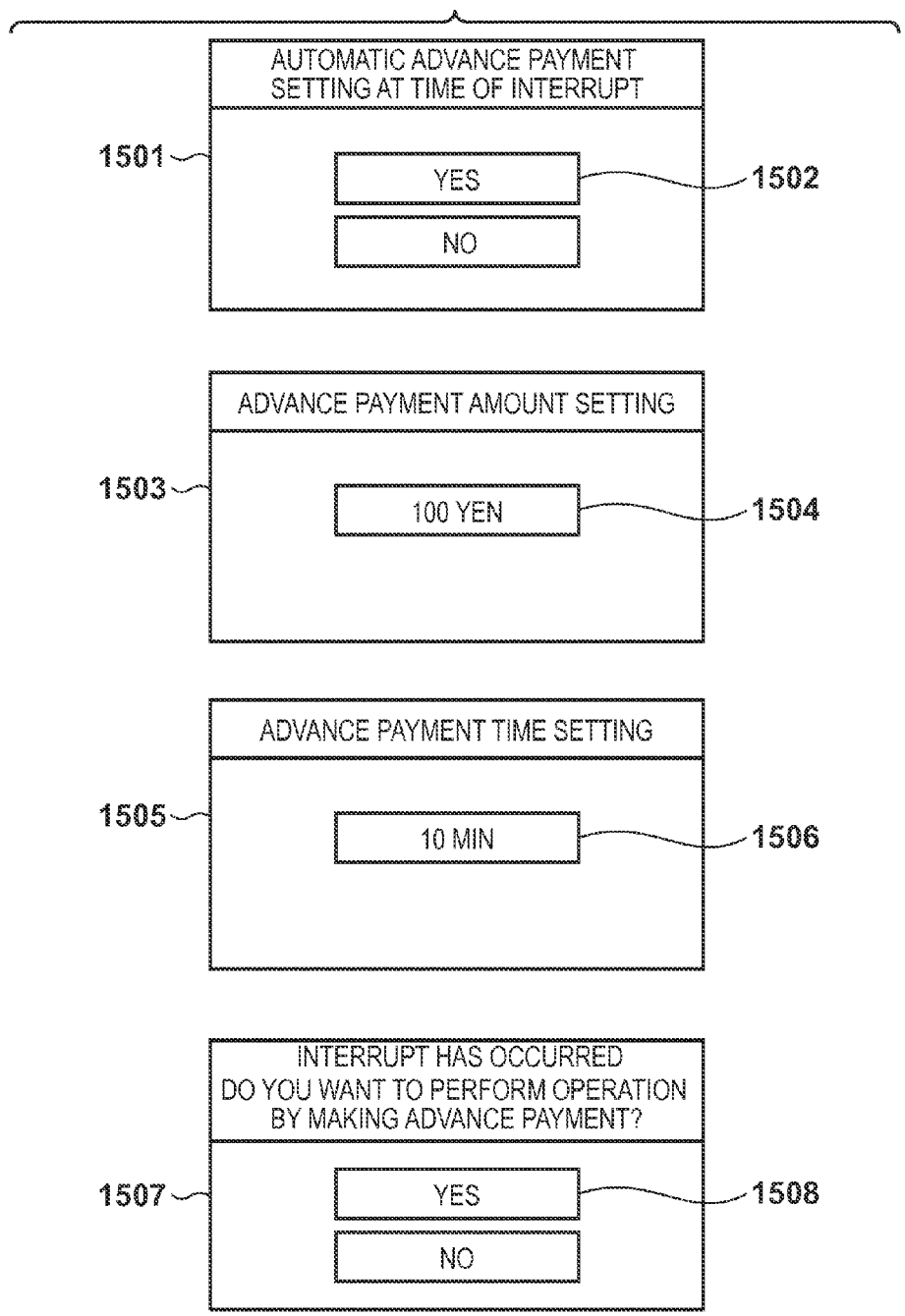
FIG. 15 is a view showing an example of an operation screen for making settings and performing operations of the mobile information processing terminal.

FIG. 15 shows an example of the operation screen for making settings and performing operations of the mobile information processing terminal 300. FIG. 15 shows an example of a setting screen displayed on the operation screen of the mobile information processing terminal 300. Items set in such screen are used to decide setting values to be used in the flowcharts shown in FIGS. 6A and 6B and subsequent drawings.

Reference numeral 1501 denotes an ON/OFF setting screen for the automatic advance payment setting at the time of an interrupt; and 1502, setting value items. The items 1502 indicate two options "YES" and "NO", and the setting value can be changed for each interrupt process.

Reference numeral 1503 denotes a screen showing an allowable amount (advance payment amount) at the time of advance payment; and 1504, a setting value item. This screen is displayed, for example, in step 1104 of FIG. 11. That is, this screen is displayed if the automatic advance payment setting is set ON in the screen 1501, or if the user has instructed to make advance payment in a screen (a screen 1507 to be described later) displayed in step 1007 of FIG. 10. As shown in FIG. 15, the amount can be displayed. Alternatively, an amount for all the remaining printing sheets can be set. Also, a plurality of amounts can be displayed, and the user can select an amount to be paid in advance. In this case, the present invention is not limited to display of a plurality of amounts, and the user can input a numerical value of an amount.

Reference numeral 1505 denotes a screen for setting a time instead of an advance payment amount; and 1506, a setting value item. This screen is displayed, for example, in step 1104 of FIG. 11. Instead of setting an amount as indicated by reference numerals 1503 and 1504, it is also possible to set a time. At this time, the MFP 100 calculates a payment amount based on the time information. Alternatively, a plurality of times can be displayed, and the user can designate a desired time (the time during which voice communication is performed), and pay in advance an amount corresponding to the time. In this case, the present invention is not limited to display of a plurality of times, and the user can input a numerical value of a time.

Furthermore, if the user selects "YES" of the options 1502 in the setting screen 1501, one of the screens 1503 and 1505 may be selected, and a setting may be made. In this case, automatic payment is made according to the selected screen.

Reference numeral 1507 denotes a screen when interrupt processing is performed; and 1508, setting value items. If no automatic interrupt processing is set, this screen is displayed on the mobile information processing terminal, and the user can select an item. That is, the screen 1507 is displayed, for example, in step 1007 of FIG. 10 when an interrupt factor such as reception of an incoming call has occurred and the automatic advance payment setting at the time of an interrupt is OFF.

The above-described method implements the system operable in a status in which a target to be charged cannot always exchange information with a printing apparatus when a charging system using short distance communication adopts a method of performing charging at the time of outputting a printed material. Note that the embodiment has been explained by assuming that charging is performed every time one paper sheet is printed. However, this is merely an example, and the smallest charging unit is not necessarily one paper sheet. For example, charging may be performed every time a predetermined number of paper sheets which is two or more paper sheets are printed. In the case of double-sided printing, charging may be performed every time one side of a paper sheet is printed. Alternatively, charging may be performed at the intervals of a predetermined time.

Especially a system configuration is implemented in which when a charging method using electronic money or the like by short distance communication is used in a mobile information processing terminal such as a smartphone, even if the user wants to perform another operation during actual print processing, it is possible to operate the mobile information processing terminal while continuing printing of an unprinted portion of a requested print job.

As a result, when the MFP executes printing, and it is necessary to operate a mobile terminal in a charging system formed by a method of performing charging by short distance communication, it is possible to perform charging without stopping printing by the MFP even if the mobile terminal is moved away from an area where short distance communication for charging is possible, by making advance payment for a print fee to the MFP.

Note that in the aforementioned embodiment, a case in which charging is performed for each predetermined unit (every time one paper sheet is printed), and advance payment processing is performed when the mobile terminal issues an advance payment request has been explained. The present invention, however, is not limited to this. When, for example, an advance payment request is issued in the middle of printing, charging for a printed portion and charging for an unprinted portion may be performed together. If no advance payment request is issued, charging may be performed upon completion of printing.

Furthermore, when the mobile information processing terminal issues a print instruction, it may instruct to perform charging after completion of printing. When a specific event (reception of an incoming call or the like) occurs, switching to advance payment may be performed according to a user instruction or settings in the mobile information processing terminal.

If, as a result of advance payment processing, a shortage of the charging amount occurs, or an amount larger than a charging amount necessary for printing is charged, the MFP notifies the mobile information processing terminal of it. In this case, the MFP may notify the terminal by Bluetooth or WLAN whose communicable range is wider than that of NFC. This allows appropriate notification even if the user leaves from the MFP due to reception of an incoming call or the like.

Note that the effects of this embodiment are not limited to the above ones, and include contents which are not described in this specification and can be implemented by the equivalence arrangement. In this embodiment, a print instruction is received from the mobile information processing terminal 300. However, the print instruction is not limited to this, and any method capable of issuing a print instruction to the MFP may be used.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-159717 filed Jul. 31, 2013, which is hereby incorporated by reference herein in its entirety.

What is claimed is:

1. A mobile information processing terminal including a communication unit configured to perform short distance communication, comprising:
   a memory configured to store a program;
   a processor configured to execute the program stored in the memory;
   wherein the processor transmits a print job to a printing apparatus based on communication via said communication unit, and
   the processor sets a time period which movement outside a range of communication with the printing apparatus by said communication unit is allowed, and
   in a case where a preset event occurs in a status in which print processing based on the print job of the printing apparatus is in progress and said communication unit is communicable with the printing apparatus, the processor transmits an advance payment request and the set time period to specify a number of paper sheets printable by the printing apparatus during the time period according to a preset condition to the printing apparatus via said communication unit, and executes payment processing of an amount requested by the printing apparatus, with respect to an unprinted portion of the print job transmitted from said transmission unit to the printing apparatus.

2. The mobile information processing terminal according to claim 1,
   wherein the processor connects the mobile information processing terminal to a line network, and
   wherein the preset event includes at least one of reception of an incoming call via said connection unit and reception of email.

3. A control method for a mobile information processing terminal including a communication unit configured to perform short distance communication, comprising the steps of:
   transmitting a print job to a printing apparatus based on communication via the communication unit; and
   in a case where a preset event occurs in a status in which print processing based on the print job of the printing apparatus is in progress and the communication unit is communicable with the printing apparatus, setting a time period which movement outside a range of communication with the printing apparatus by said communication unit is allowed, and transmitting an advance payment request and the set time period to specify a number of paper sheets printable by the printing apparatus during the time period according to a preset condition to the printing apparatus via the communication unit, and executing payment processing of an amount requested by the printing apparatus, with respect to an unprinted portion of the print job transmitted to the printing apparatus in the step of transmitting the print job.

4. A non-transitory computer-readable storage medium storing a program for causing a computer, which is incorporated in a mobile information processing terminal including a communication unit, to
   transmit a print job to a printing apparatus based on communication via the communication unit; and
   in a case where a preset event occurs in a status in which print processing based on the print job of the printing apparatus is in progress and the communication unit is communicable with the printing apparatus, set a time period which movement outside a range of communication with the printing apparatus by said communication unit is allowed, and transmit an advance payment request and the set time period to specify a number of paper sheets printable by the printing apparatus during the time period according to a preset condition to the printing apparatus via the communication unit, and executing payment processing of an amount requested by the printing apparatus, with respect to an unprinted portion of the print job transmitted to the printing apparatus in the step of transmitting the print job.

5. A printing system including a printing apparatus and a mobile information processing terminal which includes a communication unit configured to perform short distance wireless communication,
   wherein said mobile information processing terminal transmits a print job to a printing apparatus based on communication via said communication unit, and
   said mobile information processing terminal sets a time period during which movement outside a range of communication with the printing apparatus by said communication unit is allowed, and
   in a case where a preset event occurs in a status in which print processing based on the print job of the printing apparatus is in progress and said communication unit is communicable with the printing apparatus, said mobile information processing terminal transmits an advance payment request and the set time period to specify a number of paper sheets printable by the printing apparatus during the time period according to a preset condition to the printing apparatus via said communication unit, and execute payment processing of an amount requested by the printing apparatus, with respect to an unprinted portion of the print job transmitted from said transmission unit to the printing apparatus, and
   said printing apparatus, in a case where a print job transmitted by said mobile information processing terminal based on the communication via said communication unit is received, and an advance payment request for an unprinted portion of the print job is received from said mobile information processing terminal via said communication unit during print processing based on the received print job, performs charging processing based on the payment processing by said mobile information processing terminal, and
   said printing apparatus executes print processing of the unprinted portion within a chargeable range in the charging processing.

6. The printing system according to claim 5, wherein said printing apparatus charges the mobile information processing terminal via said communication unit every time a predetermined number of paper sheets are printed, and in a case where the advance payment request is received, performs the charging processing based on the advance payment request.

7. The printing system according to claim 5, wherein said mobile information processing terminal, in a case where the advance payment request is received from the information processing terminal, calculates a charging amount for the unprinted portion, and notifies the information processing terminal of information including a result of the calculation, and in a case where the advance payment request is received from said mobile information processing terminal, said printing apparatus charges the amount indicated by the advance payment request as a result of the notification.

8. The printing system according to claim 6, wherein the predetermined number of paper sheets is one.

* * * * *